US010861089B2

(12) United States Patent
Kay et al.

(10) Patent No.: US 10,861,089 B2
(45) Date of Patent: Dec. 8, 2020

(54) SYSTEM AND METHOD FOR CUSTOMIZING REAL-TIME APPLICATIONS ON A USER INTERFACE

(75) Inventors: Christopher E. Kay, Palo Alto, CA (US); Sam Lising, San Francisco, CA (US); Sopnendu Mohanty, Singapore (SG)

(73) Assignee: Citibank, N.A., New York, NY (US)

( * ) Notice: Subject to any disclaimer, the term of this patent is extended or adjusted under 35 U.S.C. 154(b) by 1816 days.

(21) Appl. No.: 13/082,654

(22) Filed: Apr. 8, 2011

(65) Prior Publication Data

US 2011/0251949 A1 Oct. 13, 2011

Related U.S. Application Data

(60) Provisional application No. 61/322,377, filed on Apr. 9, 2010.

(51) Int. Cl.
*G06Q 40/00* (2012.01)
*G06Q 20/10* (2012.01)
*G06Q 30/02* (2012.01)

(52) U.S. Cl.
CPC ............ *G06Q 40/00* (2013.01); *G06Q 20/10* (2013.01); *G06Q 30/02* (2013.01)

(58) Field of Classification Search
CPC combination set(s) only.
See application file for complete search history.

(56) References Cited

U.S. PATENT DOCUMENTS 5,659,165 A * 8/1997 Jennings ................ G06Q 40/02
235/379

6,149,055 A 11/2000 Gatto
(Continued)

FOREIGN PATENT DOCUMENTS

WO 2011/127357 A1 10/2011

OTHER PUBLICATIONS

Australia Patent Examination Report No. 1 issued in Australian Patent Application No. 2011237390 dated Dec. 5, 2014, with English Translation. (Year: 2014).*
(Continued)

*Primary Examiner* — Muriel S Tinkler
(74) *Attorney, Agent, or Firm* — Foley & Lardner LLP

(57) ABSTRACT

A computer-implemented method for customizing a user interface comprises receiving, from a touchpoint device, identification information entered by a user; accessing a record of the user from a database using the received identification information; determining whether the record has any application windows configured for the user interface on the touchpoint device; transmitting, by a server to the touchpoint device, at least a first financial application window and a second financial application window identified by the record of the user for display of the first financial application window and the second financial application window simultaneously on the user interface of the touchpoint device; receiving instructions from the user via the first financial application window to perform a financial transaction; and performing, by a server, the financial transaction while the touchpoint device displays at least the first financial application window and the second financial application window, wherein the first financial application window and the second financial application window are updated with real-time information.

18 Claims, 21 Drawing Sheets

(56) References Cited

U.S. PATENT DOCUMENTS

| | | | |
|---|---|---|---|
| 7,792,748 B1* | 9/2010 | Ebersole | G06Q 20/10 705/39 |
| 2003/0040959 A1* | 2/2003 | Fei | G06Q 20/10 705/14.4 |
| 2003/0110117 A1* | 6/2003 | Saidenberg | G06Q 40/06 705/36 R |
| 2006/0010059 A1* | 1/2006 | Park | G06F 9/451 705/35 |
| 2006/0259407 A1* | 11/2006 | Rosenthal | G06Q 40/04 705/37 |
| 2010/0010823 A1* | 1/2010 | Scipioni | G06Q 30/02 705/1.1 |

OTHER PUBLICATIONS

Polish Office Action issued in Polish Patent Application No. P-402522 dated Oct. 3, 2014, with English Translation. (Year: 2014).*

International Search Report and Written Opinion for PCT/US2011/031701, dated Jun. 8, 2011.

Australian Patent Examination Report No. 1 issued in Australian Patent Application No. 2011237390 dated Dec. 5, 2014, with English Translation.

Polish Office Action issued in Polish Patent Application No. P-402522 dated Sep. 30, 2-1, with English Translation.

* cited by examiner

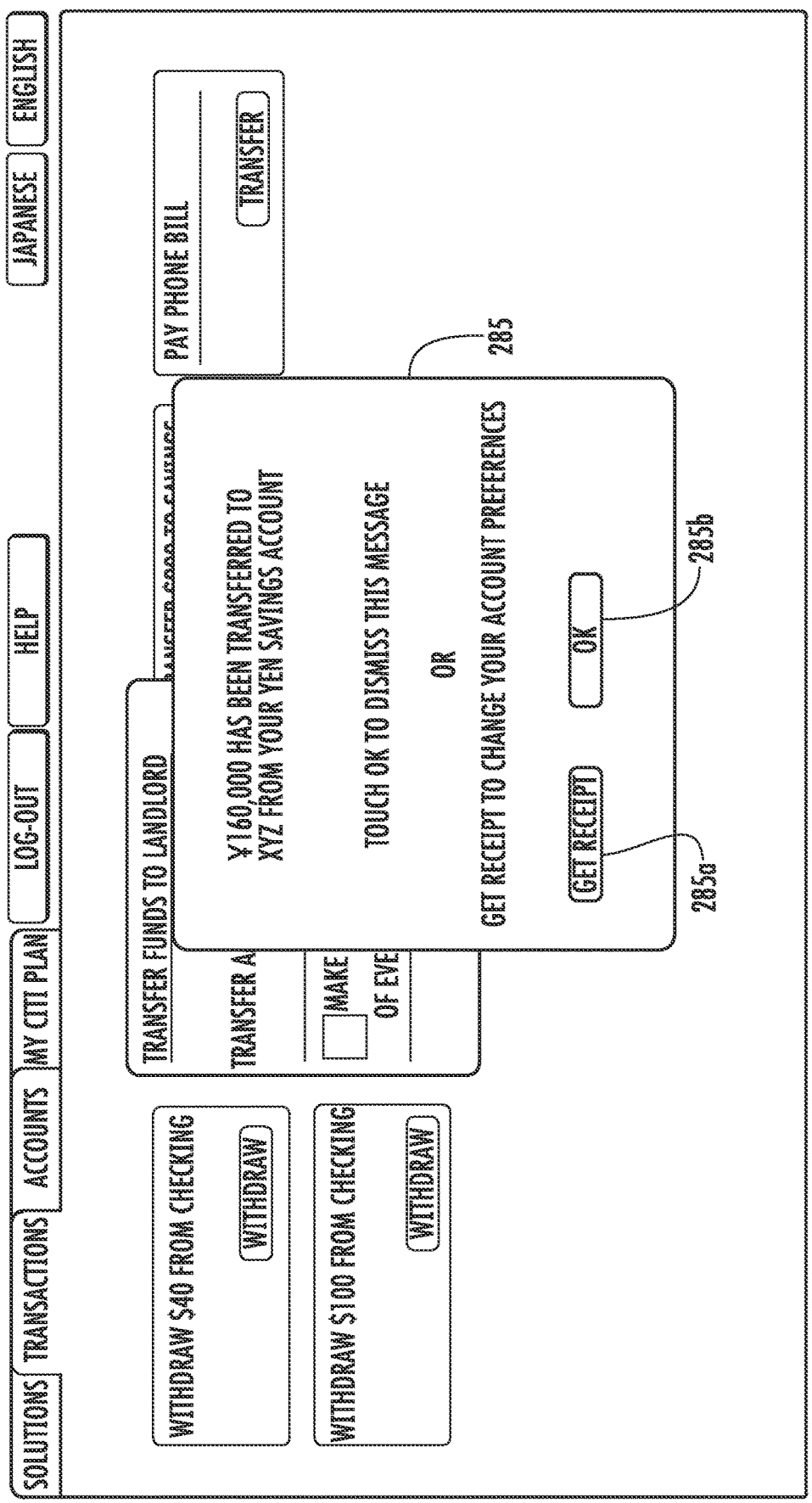

SYSTEM AND METHOD FOR CUSTOMIZING REAL-TIME APPLICATIONS ON A USER INTERFACE

CROSS-REFERENCE TO RELATED APPLICATIONS

This application claims priority to U.S. Provisional Patent Application Ser. No. 61/322,377, filed Apr. 9, 2010, entitled "System and Method for Customizing Real-Time Applications on a User Interface," which is hereby incorporated by reference in its entirety.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF THE INVENTION

The present invention relates to a method and system for customizing financial applications on a user interface.

BACKGROUND

Financial institutions provide a vast array of financial services and products to customers and potential customers. Traditionally, a user interface on a personal computer or an ATM has been limited to a particular financial transaction. As a result, the user cannot monitor other activities in real-time. Additionally, the user cannot perform a financial transaction while other financial information remains on the display.

Conventional software for performing a financial transaction also requires the user to perform each transaction using the same steps, without allowing for shortcuts or ways to limit the user's required interaction. In some instances, an ATM may present an option for "Fast Cash," where the financial institution decides how much money the user can withdraw by selecting that option. However, there remains a need for allowing a user to perform transactions in a more expedited and efficient manner.

Further, once a user performs a financial transaction, conventional financial institution software does not typically allow the user to create a shortcut to a previously conducted transaction or customize a user interface to display a shortcut or requested information based upon previous actions by the user.

Accordingly, there is a need for a system and method that allows a user to customize a user interface for conducting financial transactions and monitoring financial information.

SUMMARY OF THE INVENTION

The systems and methods described herein attempt to overcome the deficiencies of the conventional methods. In some exemplary embodiments, various items of financial information from various sources within the financial institution can be presented simultaneously on a single display. In some exemplary embodiments, a user can conduct a financial transaction on a first widget while other widgets are simultaneously updated in real-time and remain viewable on the display. In some exemplary embodiments, the user can use a widget to conduct a financial transaction without all of the steps conventionally needed to perform that transaction. In some exemplary embodiments, the user can create a widget based upon a particular financial transaction. In some exemplary embodiments, customized widgets on one touchpoint device can be viewed in a similar or the same layout on a user interface on another touchpoint device.

In one embodiment, a computer-implemented method for customizing a user interface comprises receiving, from a touchpoint device, identification information entered by a user; accessing a record of the user from a database using the received identification information; determining whether the record has any application windows configured for the user interface on the touchpoint device; transmitting, by a server to the touchpoint device, at least a first financial application window and a second financial application window identified by the record of the user for display of the first financial application window and the second financial application window simultaneously on the user interface of the touchpoint device; receiving instructions from the user via the first financial application window to perform a financial transaction; and performing, by a server, the financial transaction while the touchpoint device displays at least the first financial application window and the second financial application window, wherein the first financial application window and the second financial application window are updated with real-time information.

In another embodiment, a computer-implemented method for creating a financial application window on a user interface of a touchpoint device comprises verifying, by a server, the identification of a user to access the user interface on the touchpoint device; receiving, from the touchpoint device, a request from the user to conduct a financial transaction; receiving, from the touchpoint device, transaction information for performing the financial transaction; performing, by a server, the financial transaction; presenting on the touchpoint device an option for the user to create a financial application window based upon the received transaction information; receiving, by a server, a selection by the user to create the financial application window; storing in a database a record having information about the financial application window for the user's user interface; and transmitting, by a server to the touchpoint device, information for presenting the user interface with a financial application window for performing a transaction based on the transaction information.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures:

FIGS. 2a to 2g show screenshots of a user interface of a touchpoint device according to exemplary embodiments.

FIGS. 3a to 3m show screenshots of a user interface of a touchpoint device according to exemplary embodiments.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Exemplary embodiments, as described below, expand the reach of consumer service representatives with a particular area of expertise, thereby allowing a financial institution to present customer service representatives to more customers at multiple locations and at a time when their sales and service expertise can mean the difference between solidifying a client relationship or losing the business to a competitor. These systems and methods can remove the geographical barriers that prevent a customer from accessing a specialist's knowledge in essentially real-time and allow the customer to operate in an environment that embraces the customer in the process. For example, the customer is able to meet directly with specialists in an electronic environment that creates a virtual meeting experience in which the customer will feel as if he or she is sitting across a desk from the specialist. Moreover, exemplary embodiments allow the customer to connect with a representative with particularized knowledge about an electronic document being viewed or completed by a user, without the need for the user to enter additional information about the document. As a result, the customer may not be required to enter personal information or any additional information about a desired product or service in order to speak with an appropriate representative. Instead, the customer is immediately connected to a representative who has knowledge of the customer's current status.

Figure 1:
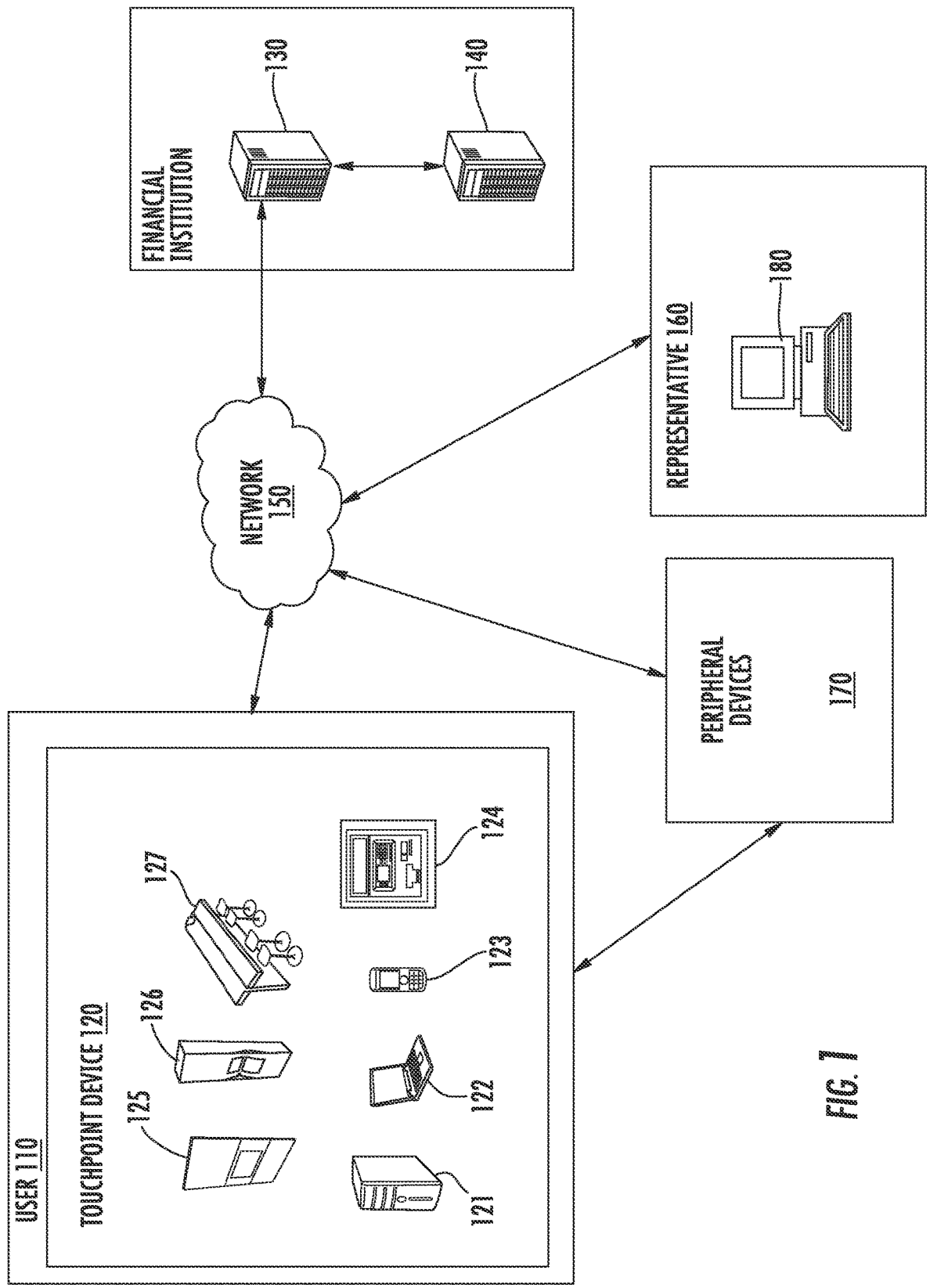
FIG. 1 shows a system architecture according to an exemplary embodiment.

Referring to FIG. 1, a user 110 operates a touchpoint device 120, such as a personal computer 121, general computer or special purpose computer 122, cellular or mobile phone 123, automated teller machine (ATM) 124, kiosk 126, personal digital assistant (PDA), tablet computer, wireless device, video phone, smart phone, or any other electronic device capable of processing data to access financial products, services, or information located on server(s) 130 (including processors, software, etc.) and/or database(s) 140 of a financial institution. The touchpoint device 120, server 130, database 140, and a customer service representative 160 having a computer 180 can communicate via electronic transmissions through communication networks 150 such as the Internet, intranets, wireless networks, Bluetooth networks, fiber optic networks, existing telephone networks, credit networks, and other networks.

It will be understood that a "user" 110 of a touchpoint device 120 includes entities including, but not limited to, existing and prospective customers of financial institutions, service and sales agents, employees, managers, groups of individuals, or another entity with an existing or potential relationship with the financial institution. For example, the user can be a customer that has an account at the financial institution. In another example, the user can be a potential customer interested in obtaining a mortgage with the financial institution. In yet another example, the user can have an account at another financial institution but is using the device or services (e.g., an ATM) of another financial institution.

Furthermore, it will be understood that the touchpoint device 120 may be portable or it can be physically located at a branch of a financial organization, a user's home or office, a transit station, a convenience store, a shopping mall, or any location where the device can be connected to a network. For example, a mobile phone 123 may access the network 150 at nearly any location in world. In another example, a kiosk 126 may be located at a branch of the financial institution. Using an input device connected to the kiosk, the user can choose and manipulate electronic documents. In yet another example, an ATM 124 can be located at a store, a branch, or almost any location throughout the world. In another embodiment, a user may log on to the system using a laptop computer located at the user's place of work.

The touchpoint device can include three components: (a) a processing component, (b) a display component, and (c) an input component. The processing component can include a computer processor necessary for handling the computations, processing, and other functionality of the device. The display can be a LCD, LED, OLED, CRT, 3D or stereoscopic screens, projectors, or any other type of display. The display component can be a screen capable of touch screen input. In one example, the display component, input component, and processing component may be combined into a single touchpoint device 120 to allow a user to enter information by touching the screen of the touchpoint device. As a result, the screen acts as the input component. Alternatively, the device can receive input from an input component instead of or in addition to a touch screen capability. In one example, the kiosk 126 may include a special purpose computer comprising a display component, processing component and an attached input component, whereby the kiosk 126 may be programmed to display a particular GUI. Exemplary input devices may include, for example, buttons, switches, dials, sliders, keys or a keypad, a navigation pad, touch pad, touch screen, mouse, trackball, stylus, and the like, any of which can be integrated in the touchpoint device or electrically coupled thereto.

Optional enhancements to the touchpoint device can add additional service features or maintain a secure session with the user. In certain embodiments, peripheral devices 170 may be connected to, or integrated in, a touchpoint device 120 to enhance a user's 110 experience. The peripheral devices may be connected through the network 150, though they may also be physically connected or even connected via a different network. Exemplary peripheral devices 170 may include video cameras, display devices, speakers, processors (along with software to carry out the process), input devices, biometric devices (e.g., for fingerprints, iris scan, facial recognition, voice recognition), printers, scanners, deposit/dispense devices, card readers, bar code readers (including QR code readers), PIN pads/electronic signature capture, remote camera controls, and other devices without limitation.

In one exemplary embodiment, a printer may be connected for the remote printing of documents, debit or credit cards, and/or physical representations of bookmarks such as bar codes or QR codes. In another embodiment, a scanner is present for the scanning of checks, documents, currency identification cards, or other identification or financial documents. Additional embodiments include peripheral devices 170 such as card readers for reading magnetic stripe and/or smart cards, such as credit and debit cards. In yet another embodiment, a remote camera controller is included such that, for example, a representative can control a camera connected to a touchpoint device to view a customer's document. In this way, a customer could "show" the representative a certain line from a physical document.

In one embodiment, a "Marketing Wall" or other advertising display, whether electronically or statically displaying information, that is positioned outside of a branch or near an entrance to the branch can draw the user 110 inside the branch to use a touchpoint device 120. For example, the Marketing Wall can include a display device, such as an LCD display, LED display, or OLED display and, optionally, speakers. The Marketing Wall may be programmed to display marketing materials to customers or potential customers such as promotions, ads, videos, music, and graphics in an attempt to coax the person to enter the branch. Once inside the branch, the user 110 may log in to one of a number of touchpoint devices 120 located throughout the branch including "Sales Walls" 125 and "Workbenches" 127. A Sales Wall 125 is a display within the branch that allows the user to complete a transaction or interact with the presented information. A Workbench 127 is similar to the Sales Wall, but has a configuration of a display on a surface of a desk for user interaction.

In one embodiment, the touchpoint device 120 is a type of kiosk known as a "360 Station" 126, wherein a user 110 can conduct financial transactions such as, for example, depositing cash or checks, withdrawing cash, and/or opening or closing an account. The 360 Station 126 can be similar to an ATM or may include additional functionality.

As discussed above, whether in the branch or at another location (e.g., en route, at home, at work, at a transit station, or other location), the user can access information from a financial institution through any of the touchpoint devices 120, including, but not limited to, the Sales Wall 125, Workbench 127, 360 Station 126, personal computer 121, general computer or special purpose computer 122, tablet computer, ATM 124, kiosk 126, PDA, wireless device, video phone, cellular or mobile phone 123, or smart phone.

In one exemplary implementation, a user can observe information presented on a Sales Wall outside of a branch. The user may recall that some financial transactions need to be performed, or the user may be interested in conducting a new financial transaction. The user enters the branch to perform the transaction and proceeds to a Workbench or ATM. Although this exemplary embodiment discusses the use of a Workbench, it is intended that any touchpoint device can be used and the use of the touchpoint device can be on the user's own initiative with or without interaction with any other financial institution advertisements.

Figure 2A:
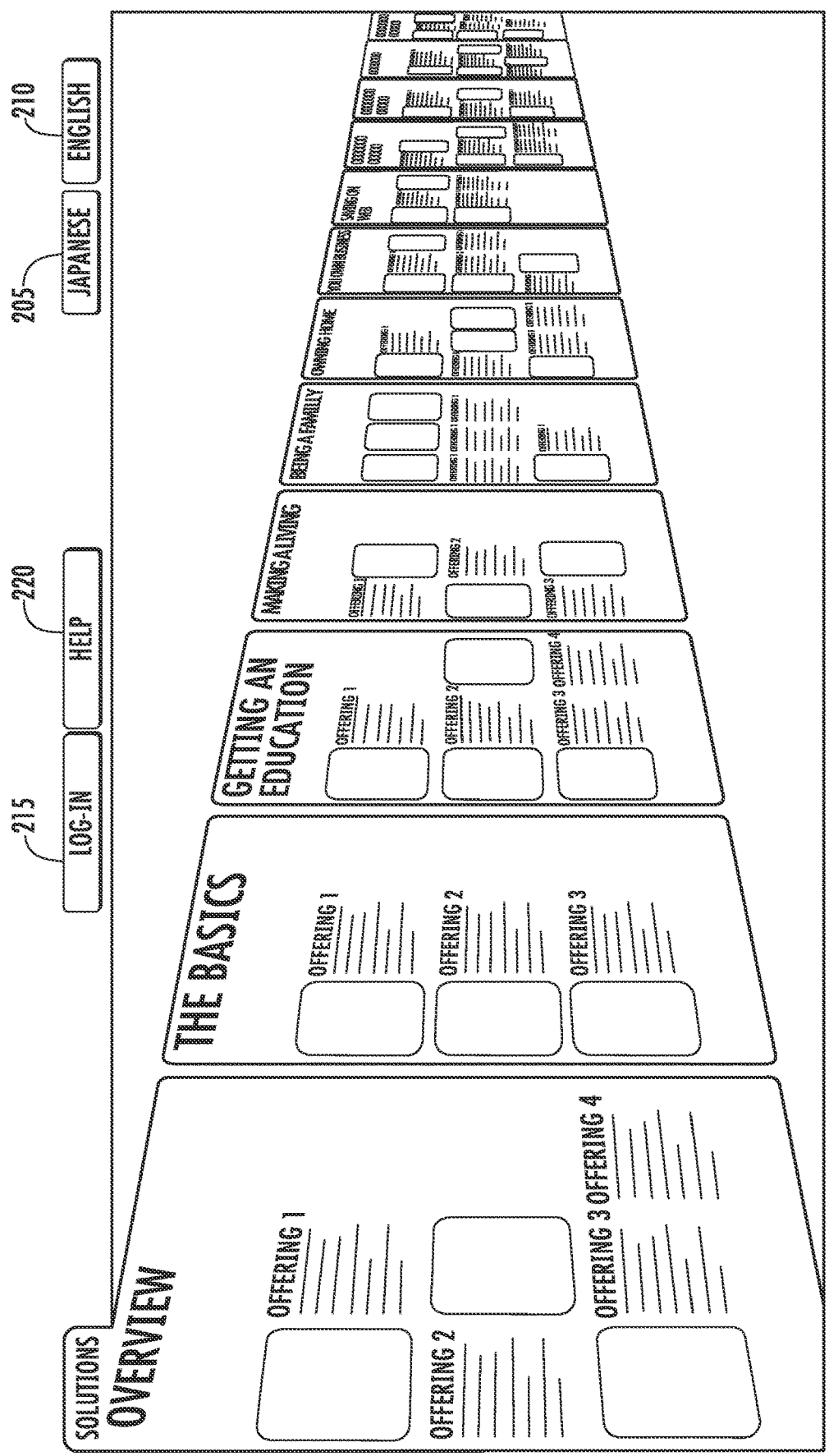

As shown in FIG. 2*a*, the touchpoint device can display a user interface 200. The user interface can display a loop of advertisements and/or information until the user interacts with the touchpoint device. The user interface presents options for language selection, such as to view the user interface in Japanese 205 or English 210. The user interface 200 also presents options to log-in 215 or receive help 220. When the user selects log-in 215, the user is directed to a log-in screen, shown in FIG. 2*b*. When using a different touchpoint device, such as a personal computer or a mobile phone, the user may be directed to a login screen rather than presenting this initial screen. The user interface 200 is shown herein with various buttons, though the particular functions and text for each button are not intended to be limiting. Further, the exemplary embodiment refers to a touchscreen where these buttons can be pressed, but it is intended that any touchpoint device can use these buttons as links or other interactive formats.

Figure 2B:
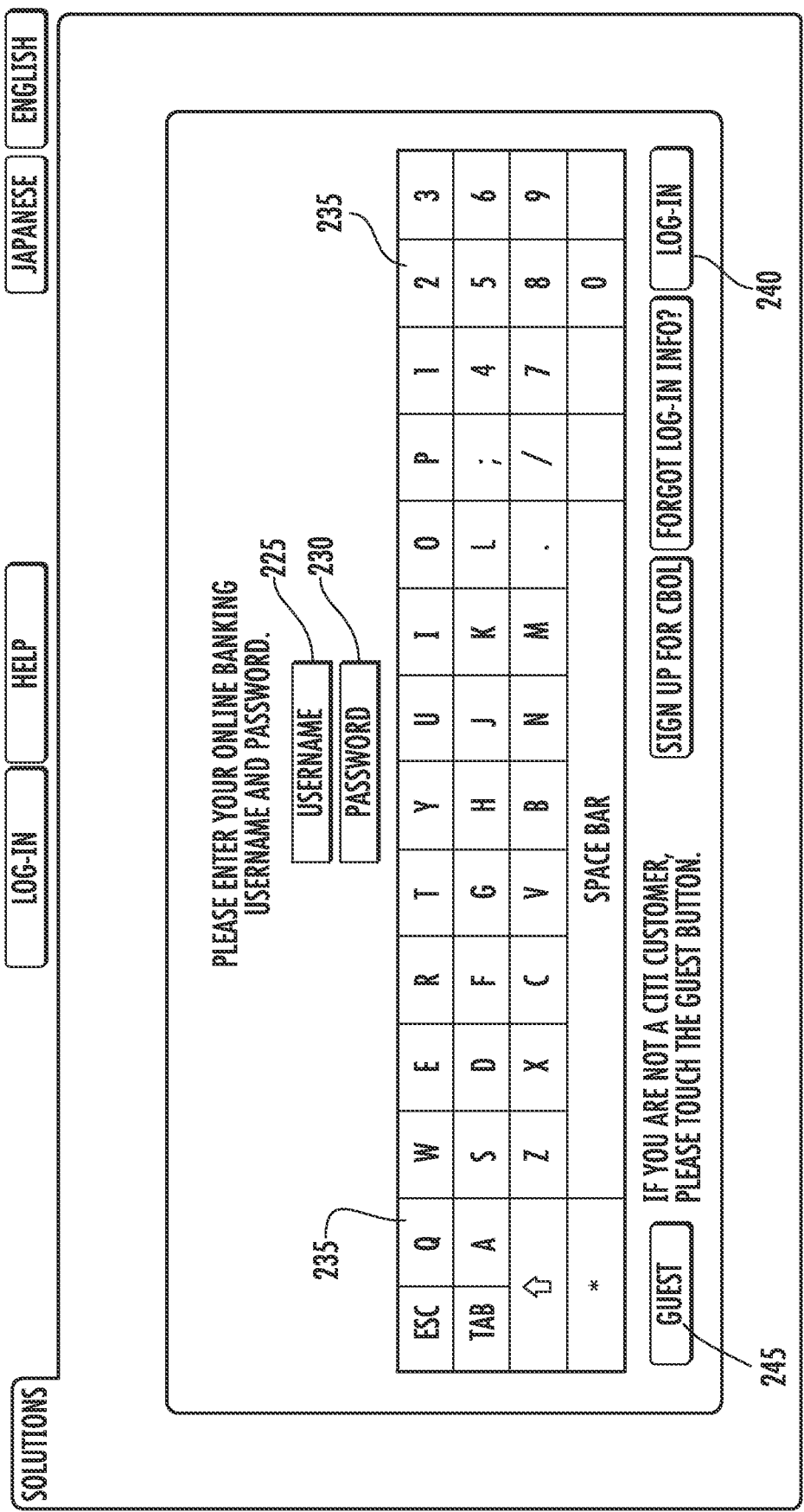

Referring to FIG. 2*b*, the user can enter a username 225 and password 230 on the user interface 200 using a keypad 235. When using a touchpoint device without a touchscreen, the user can alternatively use the keypad on the device rather than presenting one on the screen. The user enters the username 225 and password 230 and presses the "Log-in" button 240. If the user is not a customer of the financial institution, the user can enter as a guest by pressing the "Guest" button 245.

Figure 2C:
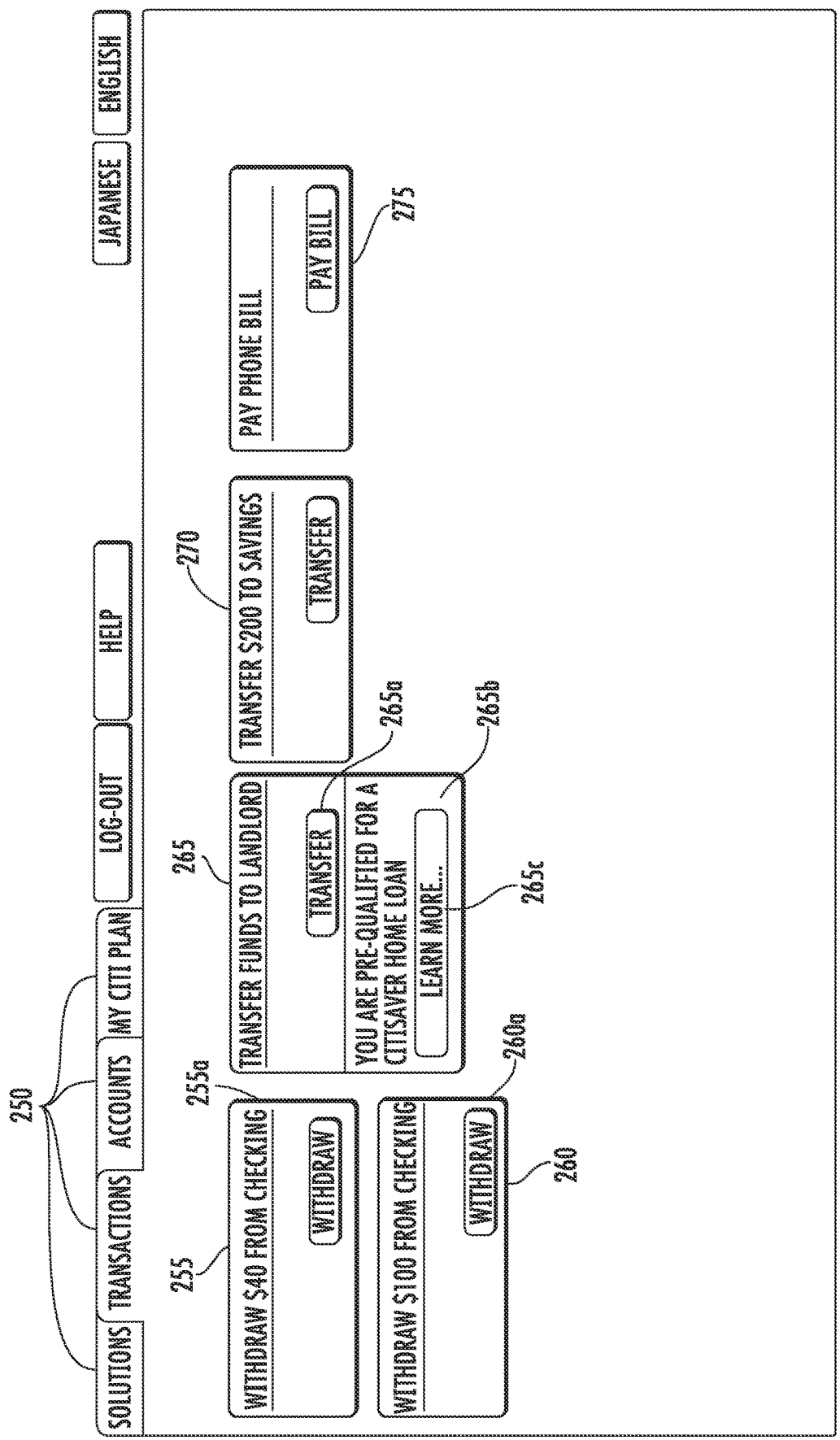

Referring to FIG. 2*c*, if the user has entered a correct username and password, the user is presented with one or more widgets on the user interface 200. If the user signed in as a guest, then the user interface 200 may display default widgets. A widget is an application that provides a display or allows for a function of a financial institution's resources. Unlike conventional widgets displayed on a website, each widget is an application of the financial institution. As a result, the financial institution can populate the information in these widgets and perform functions in a secure manner without requiring third party interaction. While conventional widgets may be standalone applications, the widgets described herein relate to features provided by the financial institution only. For example, the user interface will not display the weather and stock prices. Instead, the user interface can display widgets that relate to consumer banking, investments, or other financial institution transactions. Also, because of the dynamic nature of these widgets, the user can perform a transaction on a first widget while a second widget continues to provide real-time information. For example, the user can use a first widget to pay a bill while a second widget continues to display the user's real-time stock quotes.

The user interface 200 can present one or more tabs 250, such as Solutions, Transactions, Accounts, or My Citi Plan. Each tab 250 can present one or more widgets corresponding to that subject. In this exemplary embodiment, the Transactions tab 250 is shown. In alternative embodiments, the user interface 200 may not have any options for tabs.

A plurality of widgets are shown in FIG. 2*c*, although the user interface 200 can present one or more widgets. The amount of widgets can be set by a default or the user can customize the number and layout of widgets based upon the user's preferences and available space on the user interface 200. In one embodiment, the widgets can be presented based upon the touchpoint device being used. For example, an ATM may present a widget for withdrawing cash, but a mobile phone would not present that widget or, alternatively, may present that widget in a disabled form.

In this exemplary embodiment, user interface 200 has a $40 withdrawal widget 255, $100 withdrawal widget 260, rent payment widget 265, transfer widget 270, and utility payment widget 275. The $40 withdrawal widget 255 and the $100 withdrawal widget 260 allow the user to press the withdraw button 255*a*, 260*a* to withdraw cash from a checking account from the touchpoint device, e.g., an ATM. These widgets 255, 265 can be created by the user, who decided to create a widget for common amounts withdrawn from checking. The user can configure the widget based on the amount and the account to be withdrawn. Once the user completes a transaction, the user has the option of creating a widget based on that transaction. In another embodiment, widgets can be automatically generated based on the user's previous transactions. For example, if the user commonly withdraws $40 or $100, then the user interface can present those options as widgets for the user's convenience. Similarly, transfer widget 270 can allow the user to transfer $200 or other specified amount from one account (e.g., checking) into another account (e.g., savings).

Rent payment widget 265 allows the user to transfer funds to the user's landlord. Similarly, utility payment widget 275 allows the user to pay a phone bill or other utility bill. Referring back to the rent payment widget 265, the user can press the "Transfer" button 265a to make a rent payment to the user's landlord. The user can customize this widget 265 to withdraw the payment from a certain account (e.g., checking), for a certain amount (e.g., $1000), and to a certain person or account (e.g., the landlord).

Figure 2D:
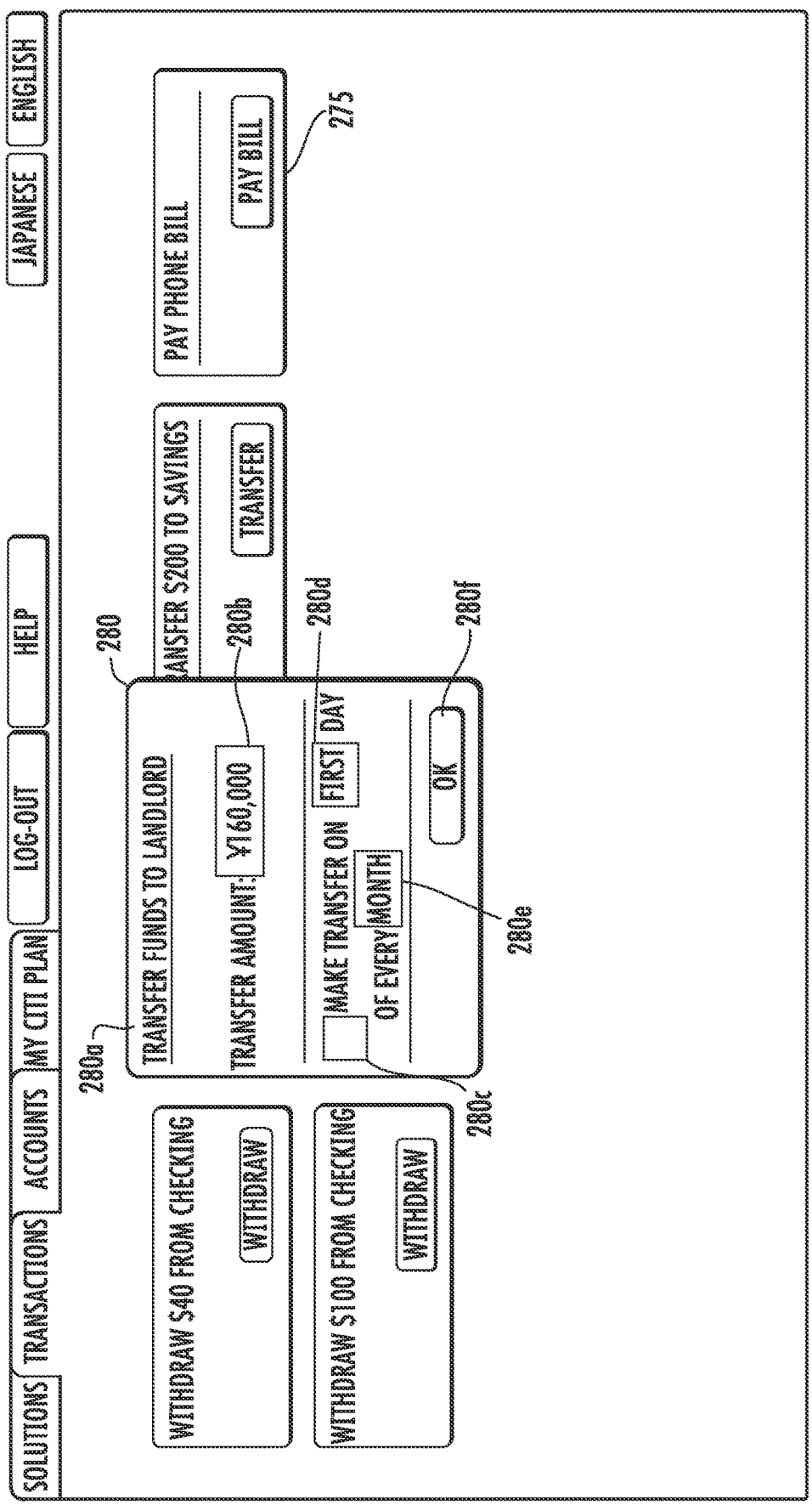

In this example, the user would like to pay rent to the landlord, so the user presses the "Transfer" button 265a. As shown in FIG. 2d, a window 280 appears on the user interface 200 that confirms the transfer of funds. The window can display that funds are transferred to a certain individual (e.g., "Transfer Funds to Landlord" 280a), allow the user to change a payment amount 280b, and allow the user to make the payment a recurring payment by clicking a box 280c for recurring payments on a specified day 280d of a specified periodicity 280e. Once the user agrees with the payment information, the user can press the "OK" button 280f. Because the user always pays the same individual with the same amount from the same account, the user can simply press "OK" to make the payment.

As shown in FIG. 2e, once the user confirms the payment instructions, a window 285 on user interface 200 confirms that the transaction has been completed and the specified amount has been transferred from the user's account to the payee. The user can press a "Get Receipt" button 285a to change account preferences (e.g., e-mail a payment receipt) or press an "OK" button 285b to close the window 285.

Referring back to FIG. 2c, an additional bar 265b can be appended to widget 265. The additional bar 265b can advise the user that the user is pre-qualified for a housing loan (i.e., a mortgage). Because these widgets are tied to a financial institution and the user may be required to log-in, the additional bar 265b may be based upon the user's financial status and opportunities so that the user can make a decision based upon the user's actual financial information. In an alternative embodiment, the additional bar 265b can present an advertisement to all or select users.

Figure 2F:
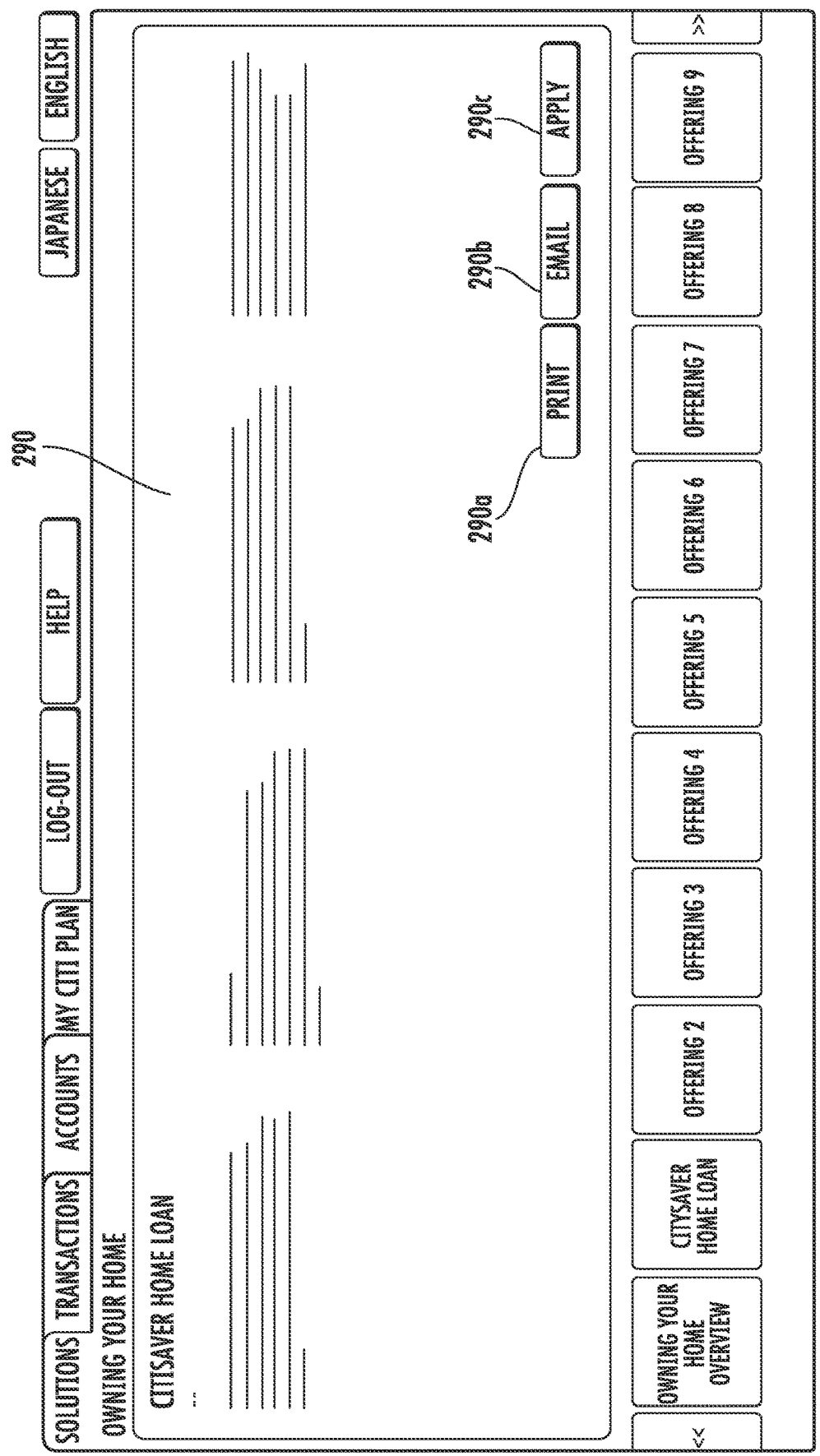

The user can press a "Learn More" button 265c to learn about a loan for which the user has been prequalified. Referring to FIG. 2f, the user interface 200 displays information 290 about a home loan available to the user. The user can print this information as a brochure by pressing a "Print" button 290a; the user can e-mail this information by pressing an "Email" button 290b; or the user can apply for this loan by pressing an "Apply" button 290c.

Figure 2G:
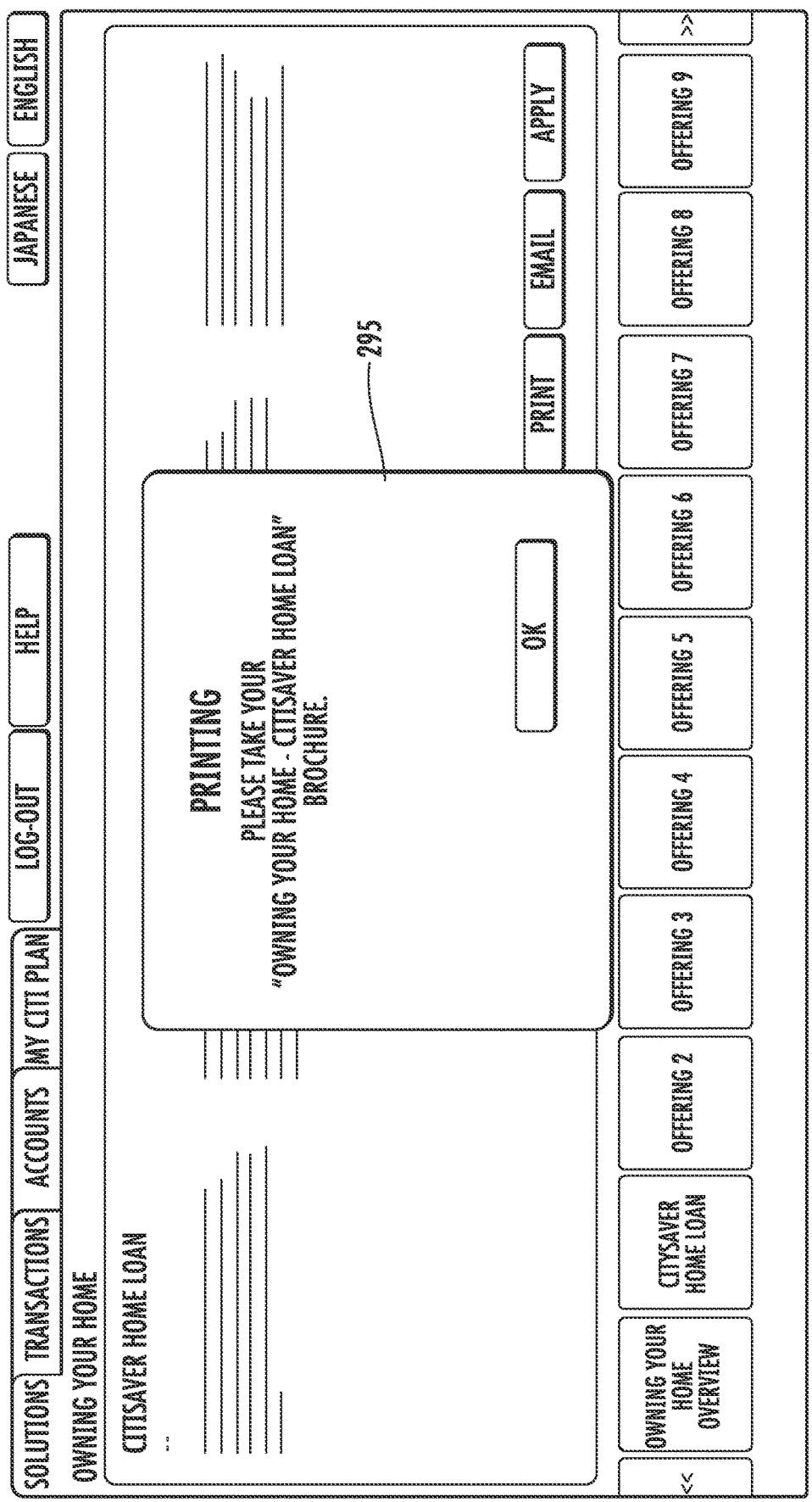

In the exemplary embodiment, the user presses "Print" button 290a. As shown in FIG. 2g, a window 295 appears on the user interface 200 indicating that a peripheral device has printed the requested information. If the user has completed all desired transactions, the user may decide to log-out.

Figure 3A:
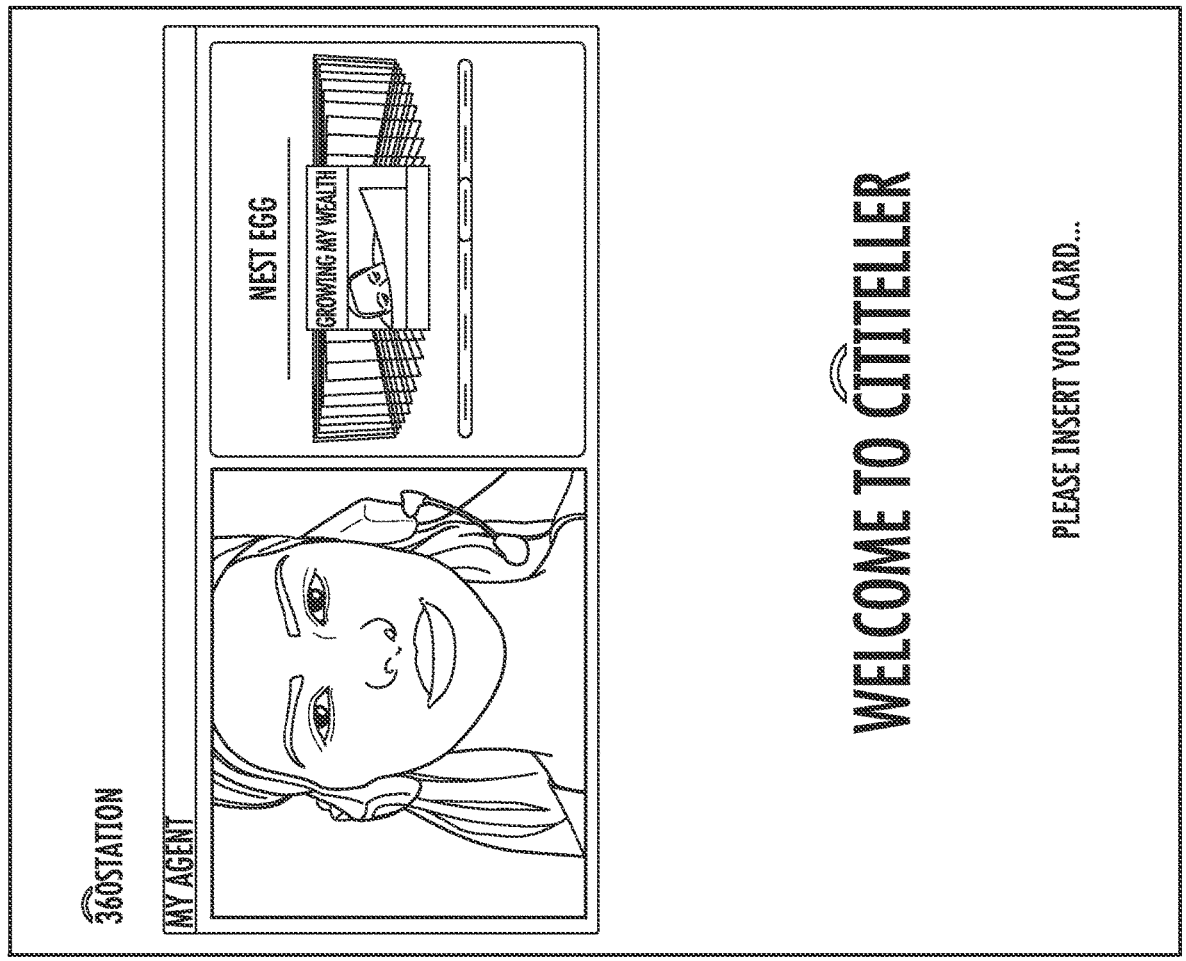

FIGS. 3a to 3m show a user interface according to an alternative exemplary embodiment. In this embodiment, the user interface is shown on a 360 Station touchpoint device, though it is intended that this user interface can be implemented across any or all touchpoint devices. Referring to FIG. 3a, a screenshot of a welcome screen of a user interface 300 is shown. The user interface 300 asks the user to insert a card for identification. Alternatively, the user can use biometric identification, enter a username and password, or use another authentication mechanism to access the user's account.

Figure 3B:
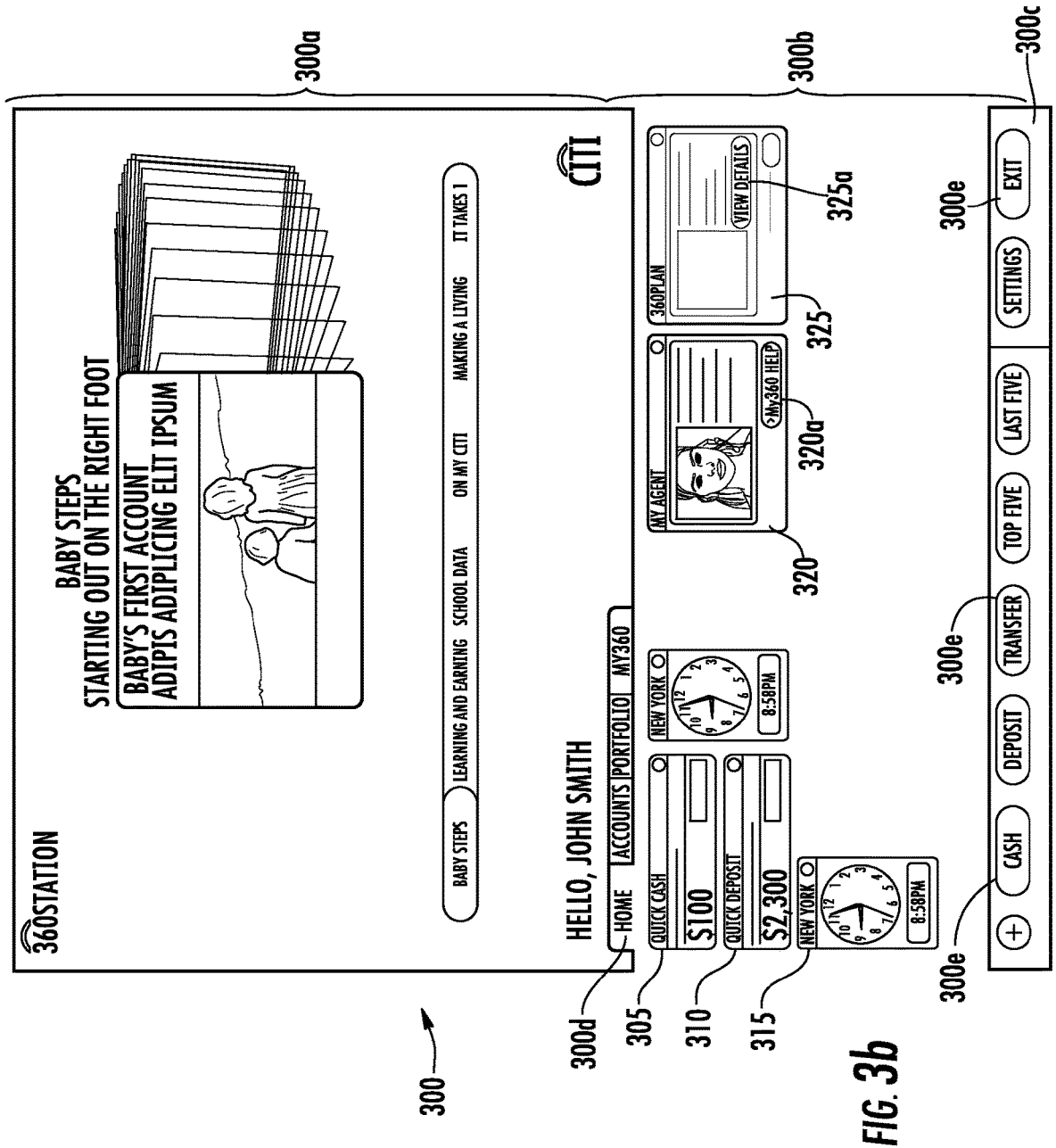

Referring to FIG. 3b, the user interface 300 presents a first portion 300a, second portion 300b, and a toolbar 300c. The first portion 300a can show information relating to a chosen action, a video of a customer service representative, website content, or any other electronic document. In alternative embodiments, the user interface does not show the first portion 300a. In other alternative embodiments, the first portion 300a appears only upon request or by an action of the user.

The second portion 300b has an area for one or more widgets, which can be rearranged about the second portion 300b. The second portion 300b can also use tabs 300d, whereby each tab 300d represents a different interface with different widgets. For example, a tab for "Accounts" may have different widgets than a tab for "Portfolio."

The toolbar 300c is shown positioned along the bottom of the user interface 300, but can appear along any edge, can float in the user interface, or can appear upon request or by an action of the user. The toolbar 300c can include a plurality of buttons 300e two adjust widget settings, perform a transaction, or exit the user interface 300.

In the exemplary embodiment in FIG. 3b, a plurality of widgets are shown, including a quick cash widget 305, a quick deposit widget 310, a time widget 315, a customer service representative widget 320, and a plan widget 325. The quick cash widget 305 allows the user to withdraw $100 of cash from a checking account by simply pressing the "Cash" button 305a of this widget 305. The quick deposit widget 310 allows the user to deposit $2,300 to a savings account by pressing the "Deposit" button 310a and inserting an envelope with a corresponding check(s) for $2,300 into the touchpoint device or a peripheral device, which may include a check reader or a scanner. The time widget 315 provides the current time in a selected location, such as New York. The customer service representative widget 320 allows the user to contact a customer service representative regarding the electronic document shown in first portion 300a or any other question via chat, video conferencing, or other interactive platform. The plan widget 325 allows the customer to review a financial plan or other related materials by clicking a "View Details" button 325a. Some of these widgets are discussed in further detail below.

Figure 3C:
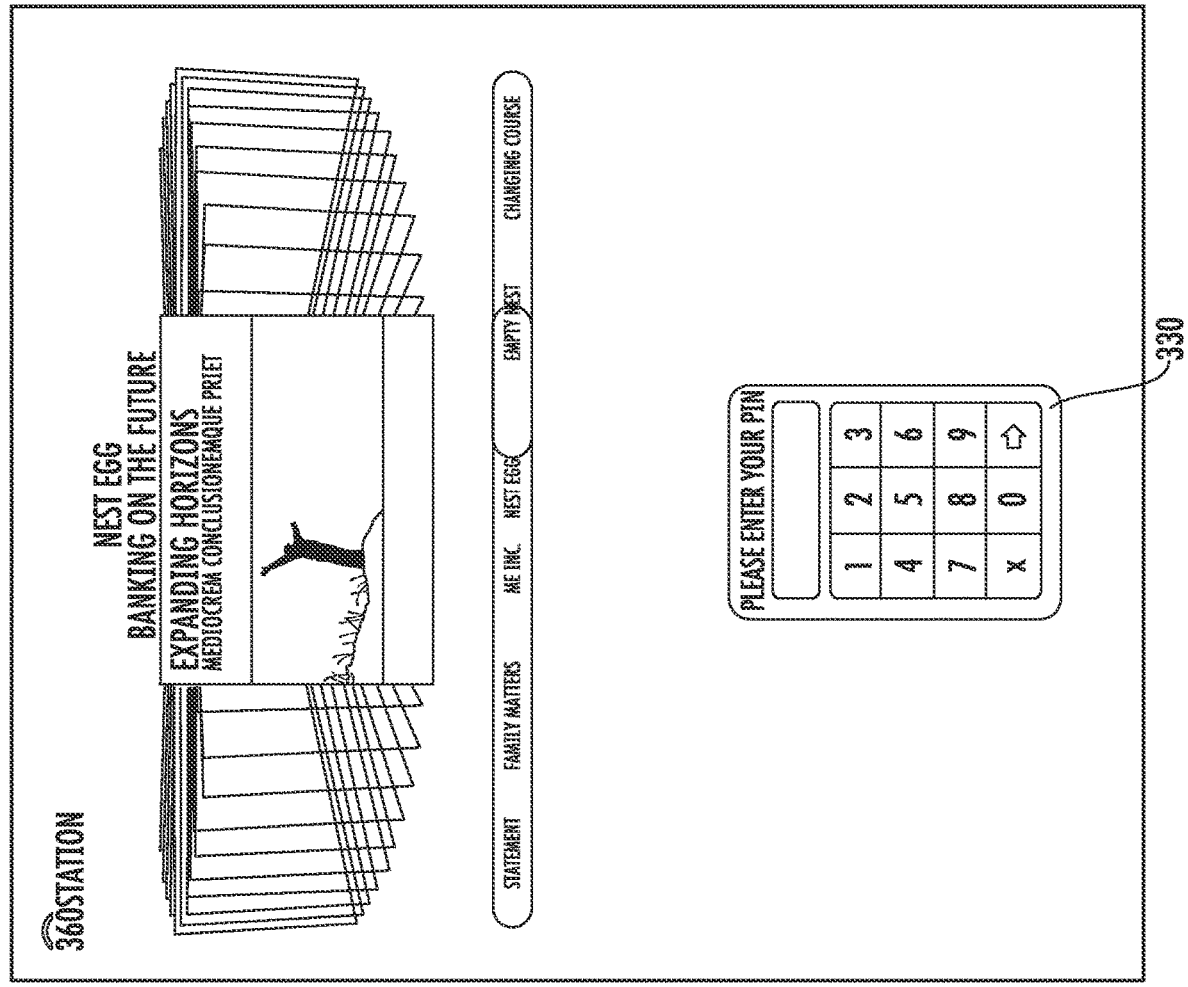
Figure 3D:
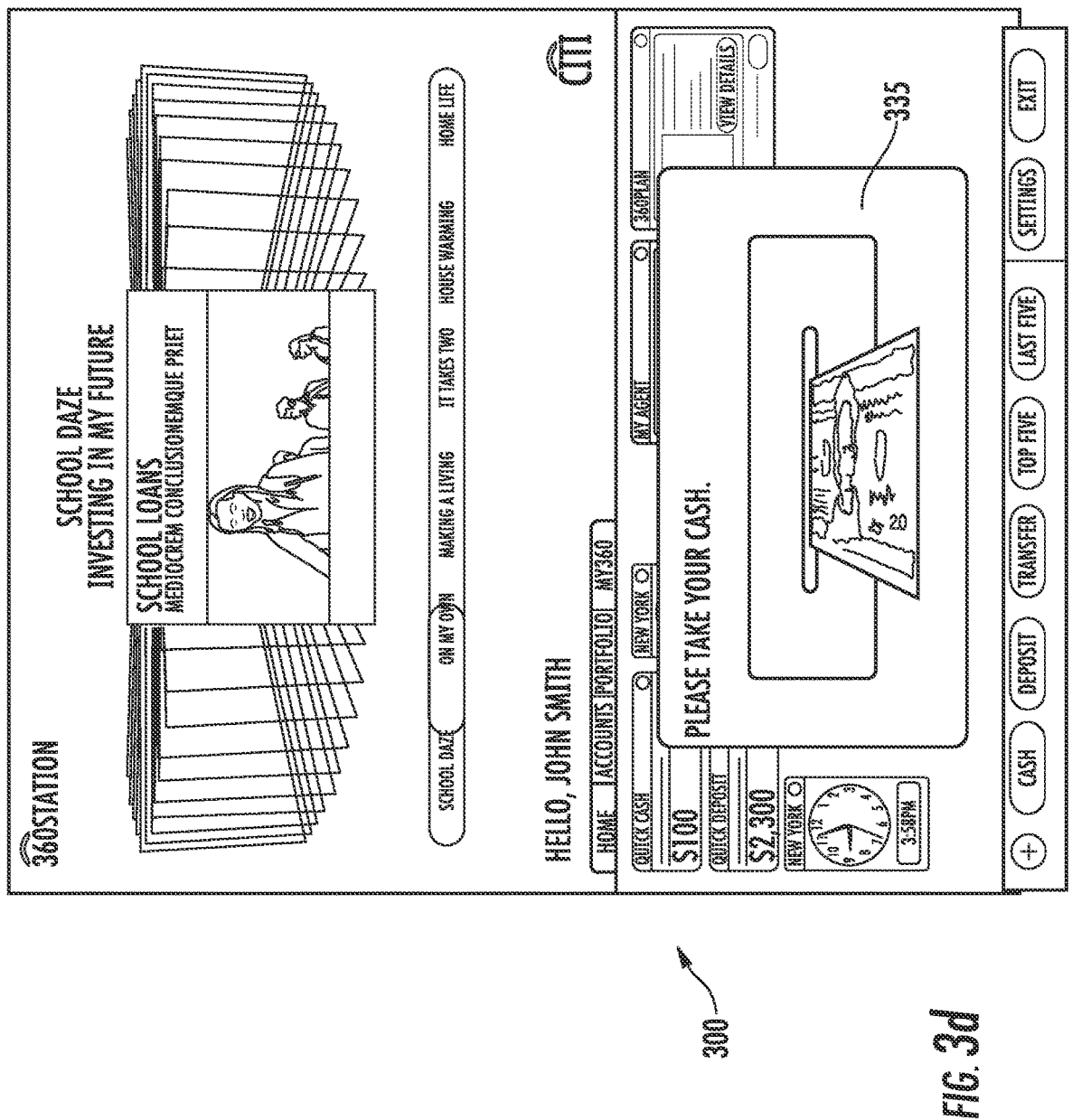

With regard to the quick cash widget 305, once the user presses button 305a to obtain cash in the specified amount, the user may be requested to enter a personal identification number (PIN). As shown in FIG. 3c, a PIN window is displayed on the user interface 300. In this exemplary embodiment, the PIN window 330 is shown on a touchscreen display of a touchpoint device. Alternatively, the user can use a peripheral keypad or other data entry device to enter a PIN. In another alternative embodiment, no keypad is shown, but the user interface requests that the user enter a PIN. In yet another alternative embodiment, the user can enter a biometric identifier or other authentication mechanism. As shown in FIG. 3d, once the user enters the correct PIN, the cash is presented to the user and the user interface 300 displays a message 335 to "Please take your cash."

With regard to the customer service representative widget 320, the user of a touchpoint device may be reviewing an electronic document in first portion 300a of the user interface 300 having information about school loans. At any point during the session, the user may input a selection by pressing button "My360 Help" 320a to request assistance from a customer service representative regarding the electronic document the user is viewing.

Figure 3E:
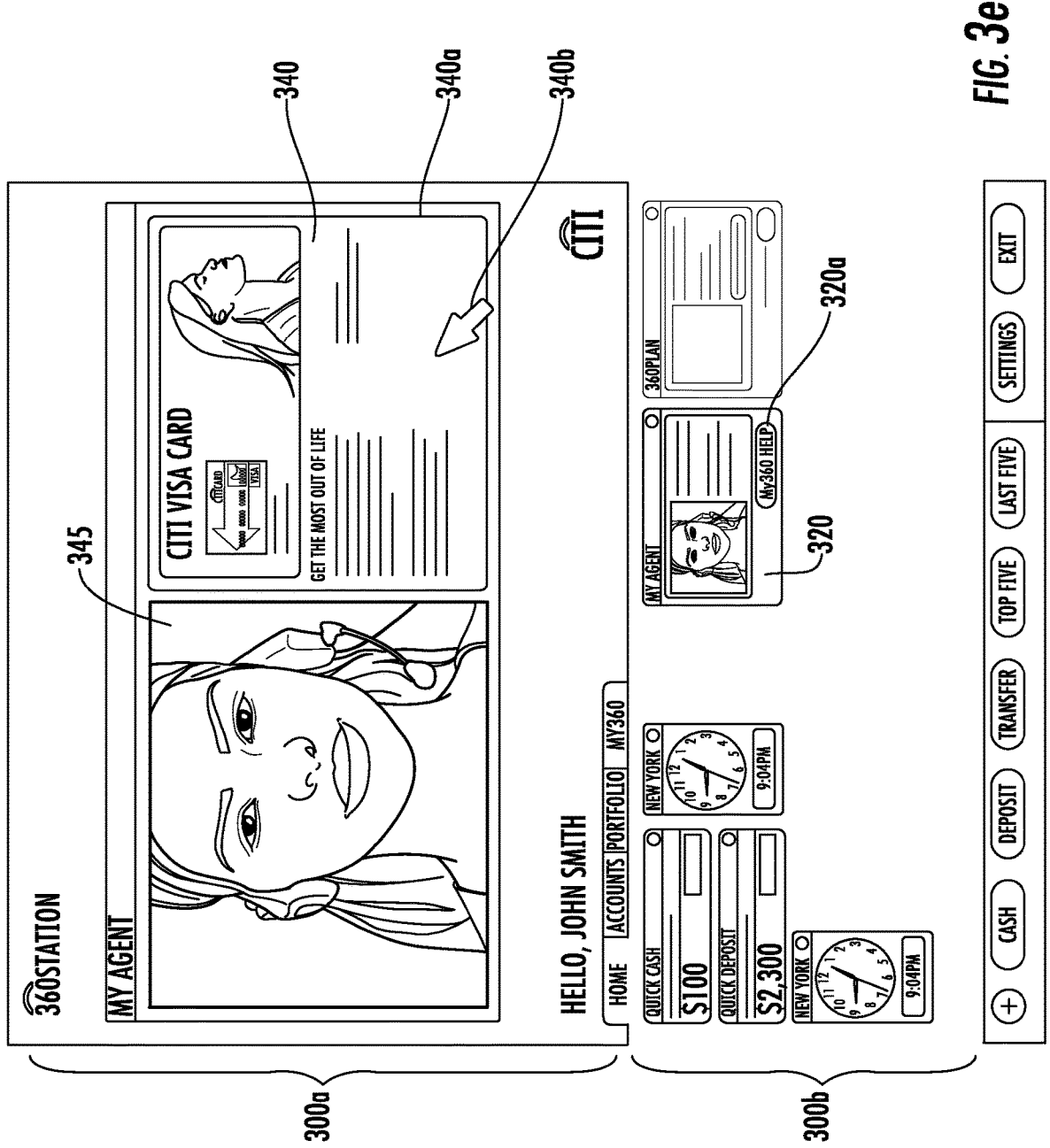

At FIG. 3e, once the user has selected the "My360 Help" button 320a, the user interface 300 presents a customer service representative in a representative video window 345, which is integrated into the user interface 300 in the first portion 300a. The customer service representative may be provided with information about the electronic document 340 that the user is viewing, and a second window 340a may be displayed on the user interface 300 in the first area 300a showing a version of the electronic document 340.

Although shown as two separate windows in FIG. 3e, it will be appreciated that the number of windows, size, appearance, and layout of the customer representative window 345 and electronic document window 340a may vary depending on many factors including the type of touchpoint device being used to access the electronic document, the hardware, software, and display components of the touchpoint device, and/or the user's preference. In certain embodiments, the user may control the size and appearance of each window. In other embodiments, the customer service window 345 and electronic document window 340a may be a single window. In yet other embodiments, the some or all windows in first portion 300a can be positioned in second portion 300b and some or all windows in the second portion 300b can be positioned in first portion 300a.

In an example embodiment, the customer service representative may gain access to the touchpoint device, including the ability to enter data and control the cursor. In this way, the representative may guide the user through the completion of the electronic document, or illustrate a particular point to the user. In this particular example, the customer service representative can use a pointer 340b to direct the user to a certain location within the electronic document 340. In another embodiment, the representative may type information, such as instructions or greetings to the user, and the information will be displayed on the touchpoint device.

Figure 3F:
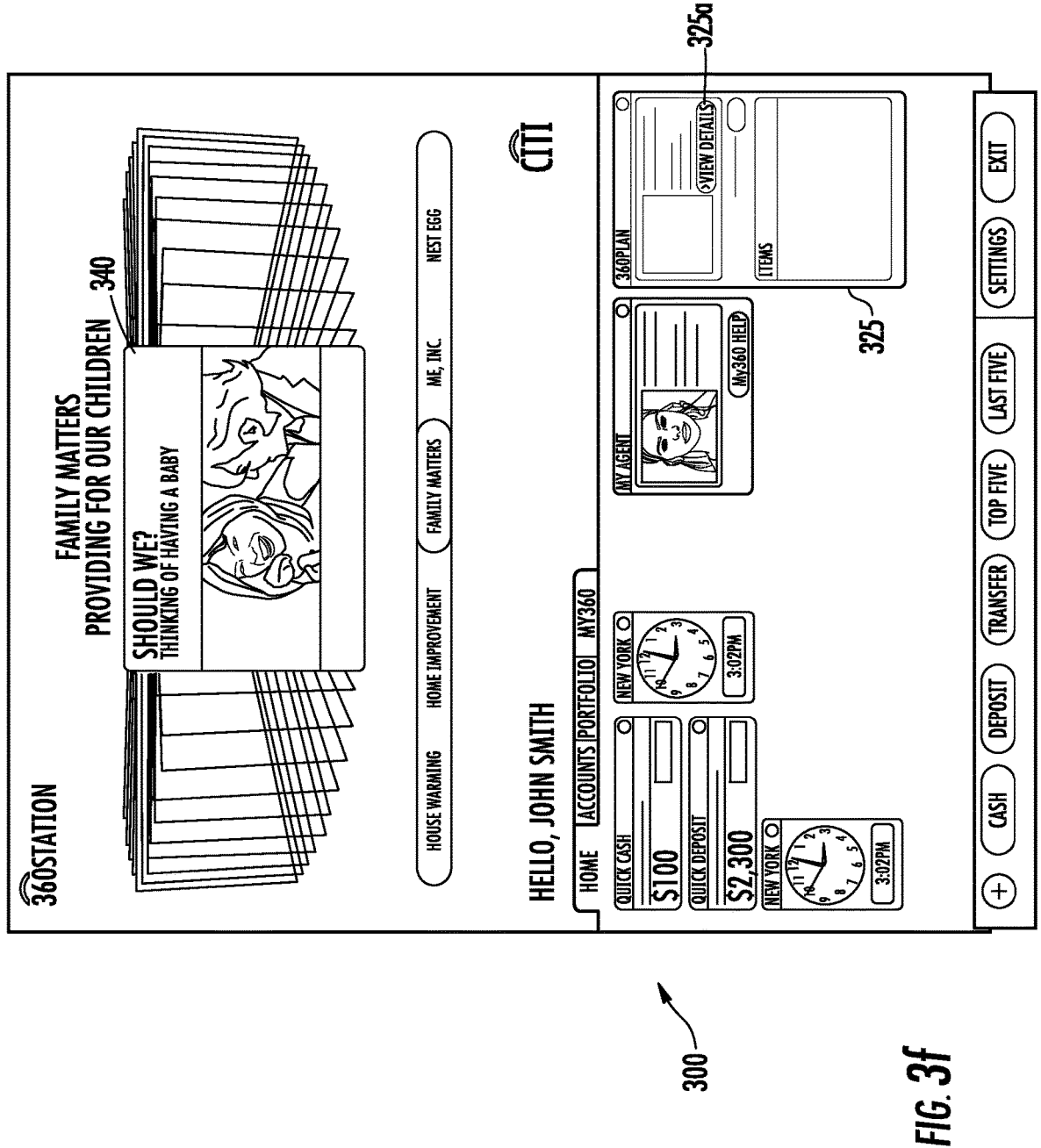

With regard to the plan widget 325, once the user selects button 325a, an expanded widget window 325 can show items or additional information, as shown in FIG. 3f. The expanded window 325 can list items that can be performed to implement the plan, such as opening an individual retirement account. When the user selects the plan widget 325, the first portion 300a can display an electronic document 340 that is directed to the content of the financial plan. So the user has access to additional information in a separate electronic document 340 about the financial plan by selecting the plan widget 325.

As shown in this exemplary embodiment, when the user selects a widget to perform a transaction or review information, the other widgets remain on the user interface and can be updated with real-time information. When a widget is selected, related information can appear in the first portion of the user interface so as to not obstruct the widgets. For example, while reviewing information about a financial plan using a first widget, other widgets showing the current time and/or current stock prices may still be updated in real-time.

Figure 3G:
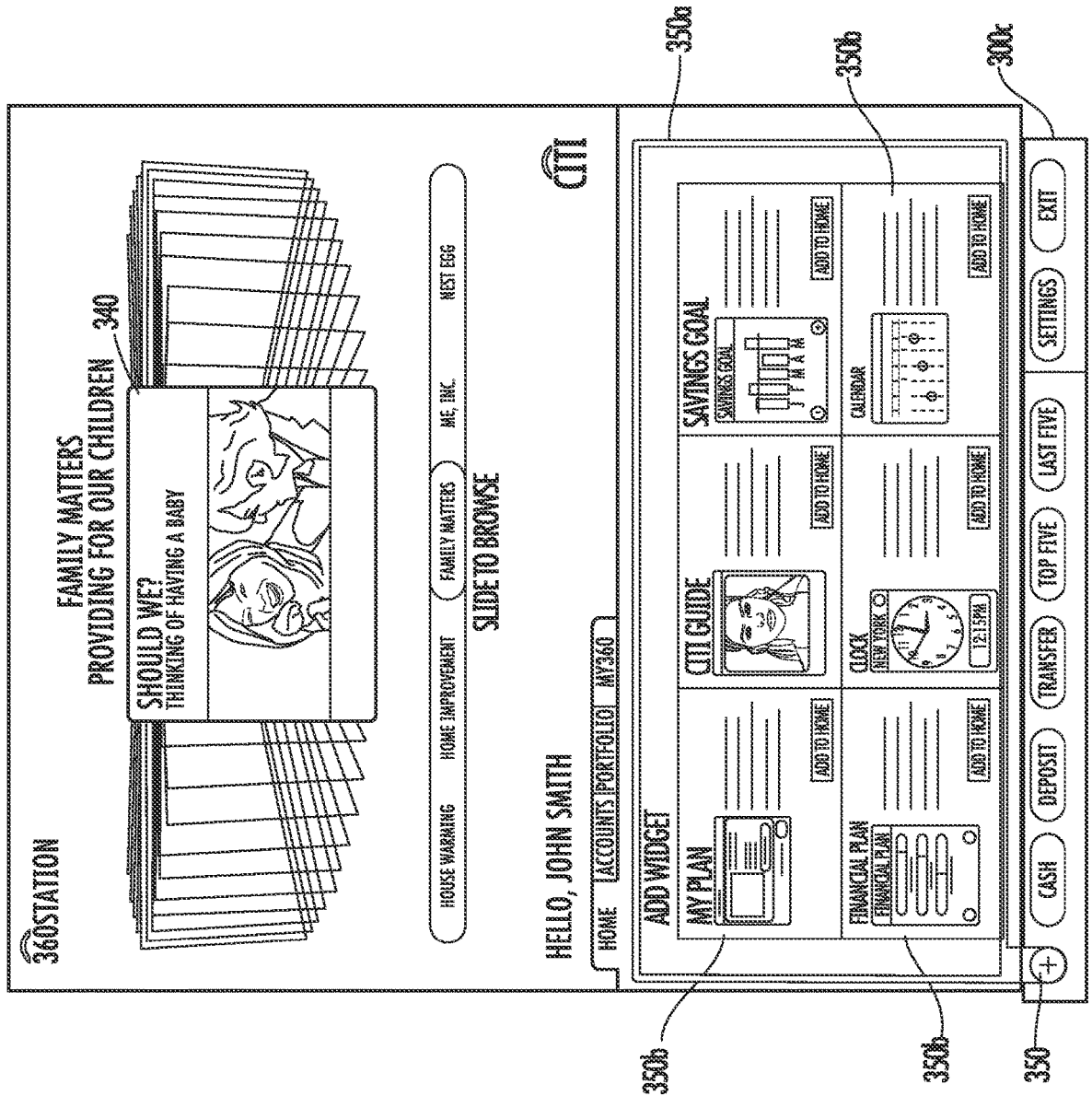

FIG. 3g shows how a widget can be added. The user can click on a "+" button 350 in the toolbar 300c. The second portion 300b then displays a window 350a of widget options 350b. By clicking any of the options 350b in the window 350a, the selected widget can be added to the second portion 300b. Once the widget is added, the user can click and drag any of the widgets to a preferred location.

Figure 3H:
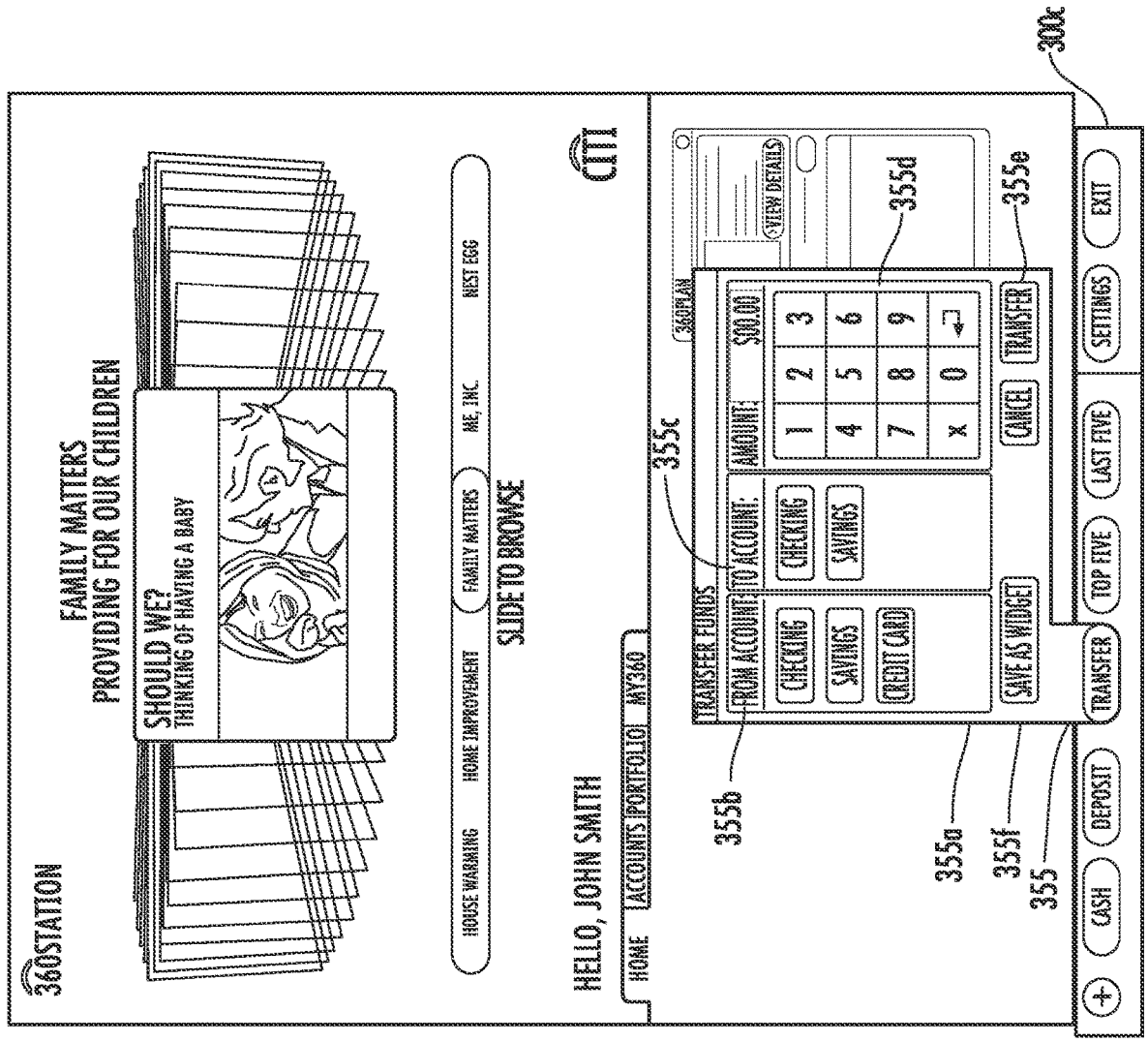
Figure 3I:
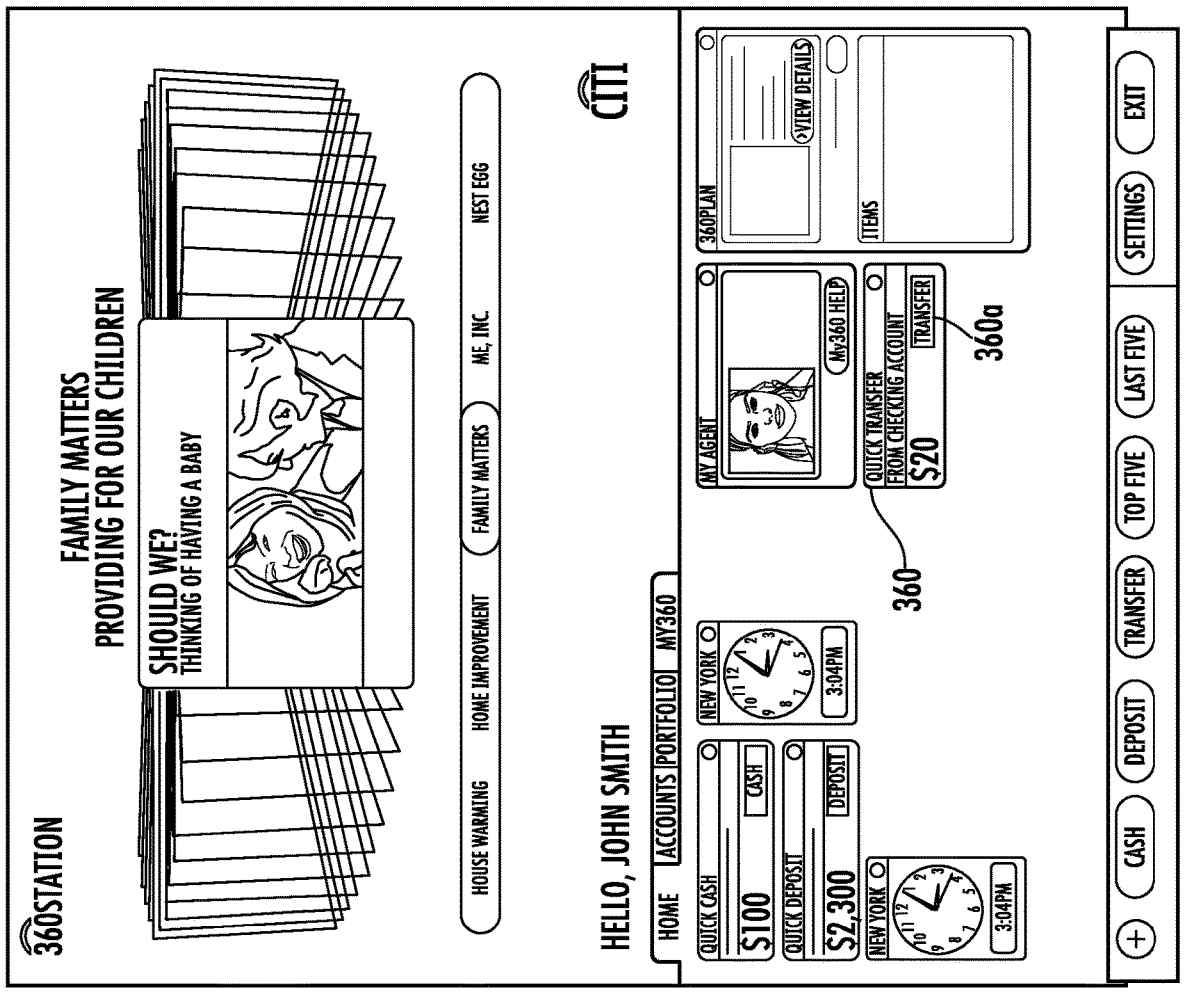
Figure 3I:
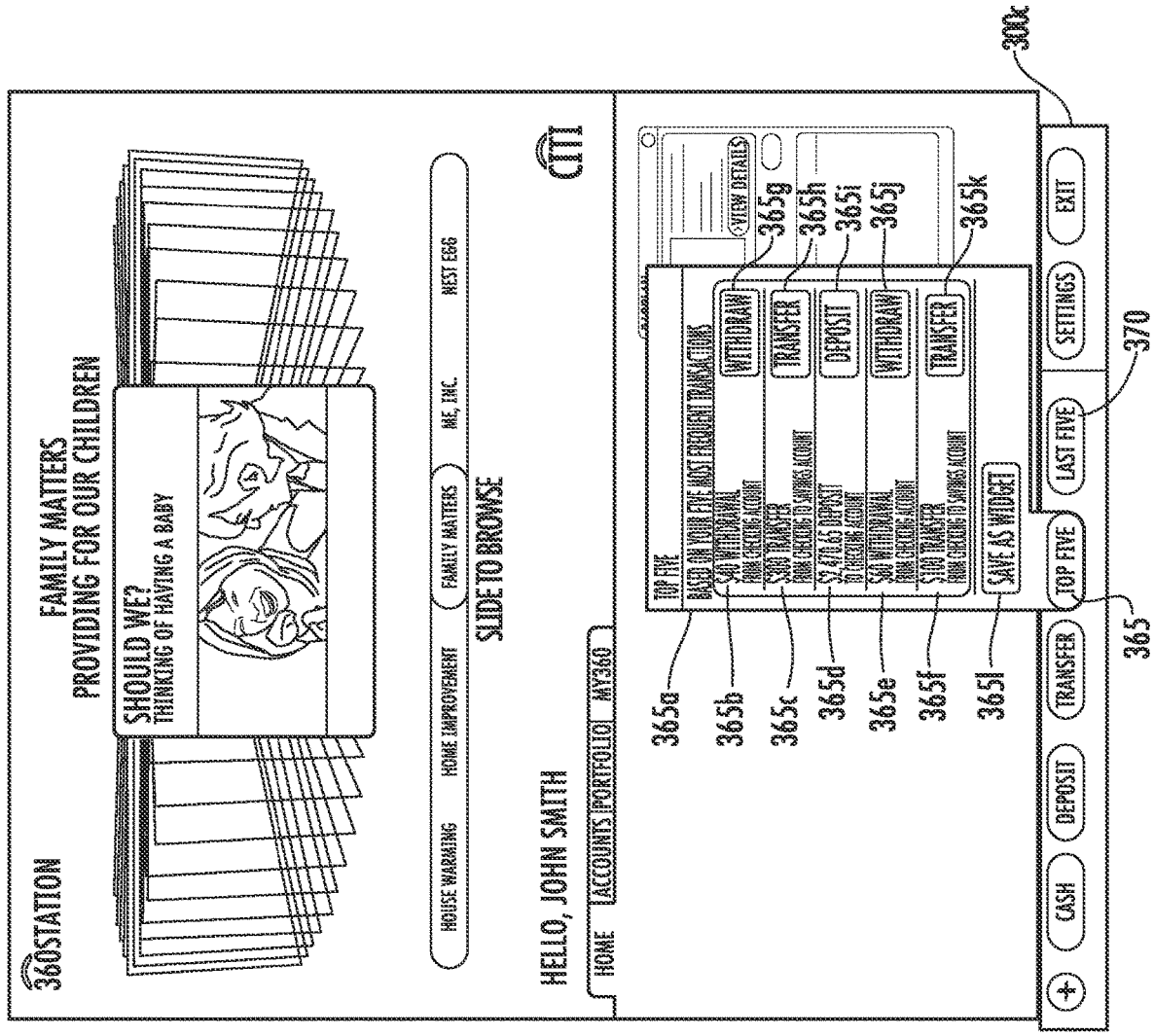

In FIG. 3h, a user can transfer funds from a first account to a second account by clicking on a "Transfer" button 355 in the toolbar 300c. A transfer window 355a appears in the second portion 300b that allows the user to select the account to withdraw 355b, the account to deposit 355c, and an amount 355d. The user can proceed with the transfer by clicking a "Transfer" button 355e. The user can also choose to create a new widget for this transaction by selecting a "Save as Widget" button 355f. The user can also choose to create this widget after proceeding with a first instance of the transfer. As shown in FIG. 3i, a new quick transfer widget 360 is shown. By clicking on "Transfer" button 360a, a transfer occurs from the first selected account to the second selected account in the designated amount, e.g., $20.

Referring to FIG. 3j, the user can click a "Top Five" button 365 on the toolbar 300c to view the user's five most frequent transactions. Similarly, the user can click a "Last Five" button 370 to view the user's last five transactions. Once the user click the button 365, a window 365a is displayed that presents the most frequent transactions 365b, 365c, 365d, 365e, 365f over a designated period of time, e.g., the last month. The user can select to perform any of these transactions 365b, 365c, 365d, 365e, 365f by clicking a corresponding button 365g, 365h, 365i, 365j, 365k for each transaction. The user can also choose to save a particular transaction as a widget. In an alternative embodiment, the user can save all five transactions as a widget by selecting a "Save as Widget" button 365l.

Figure 3K:
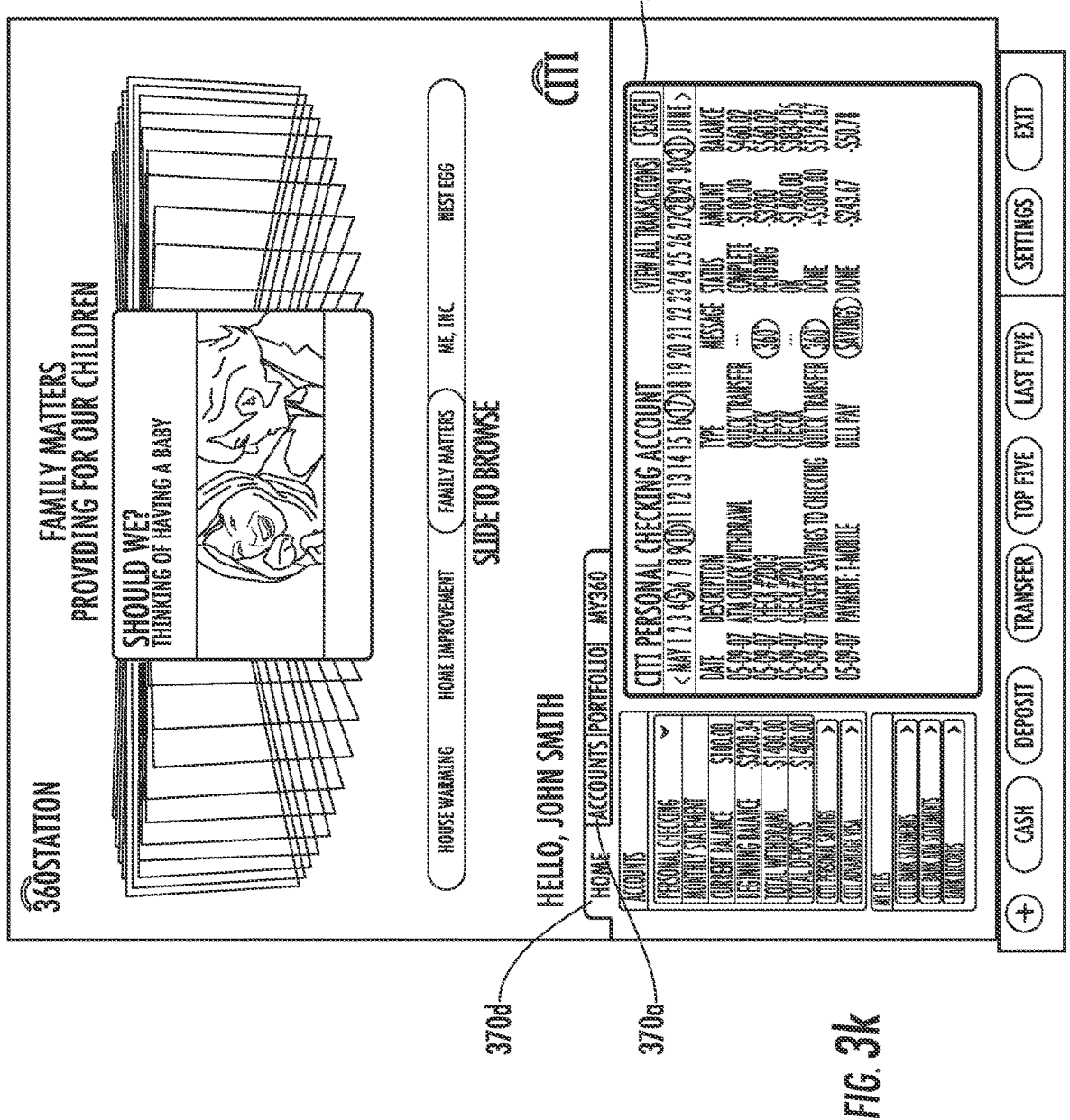
Figure 3I:
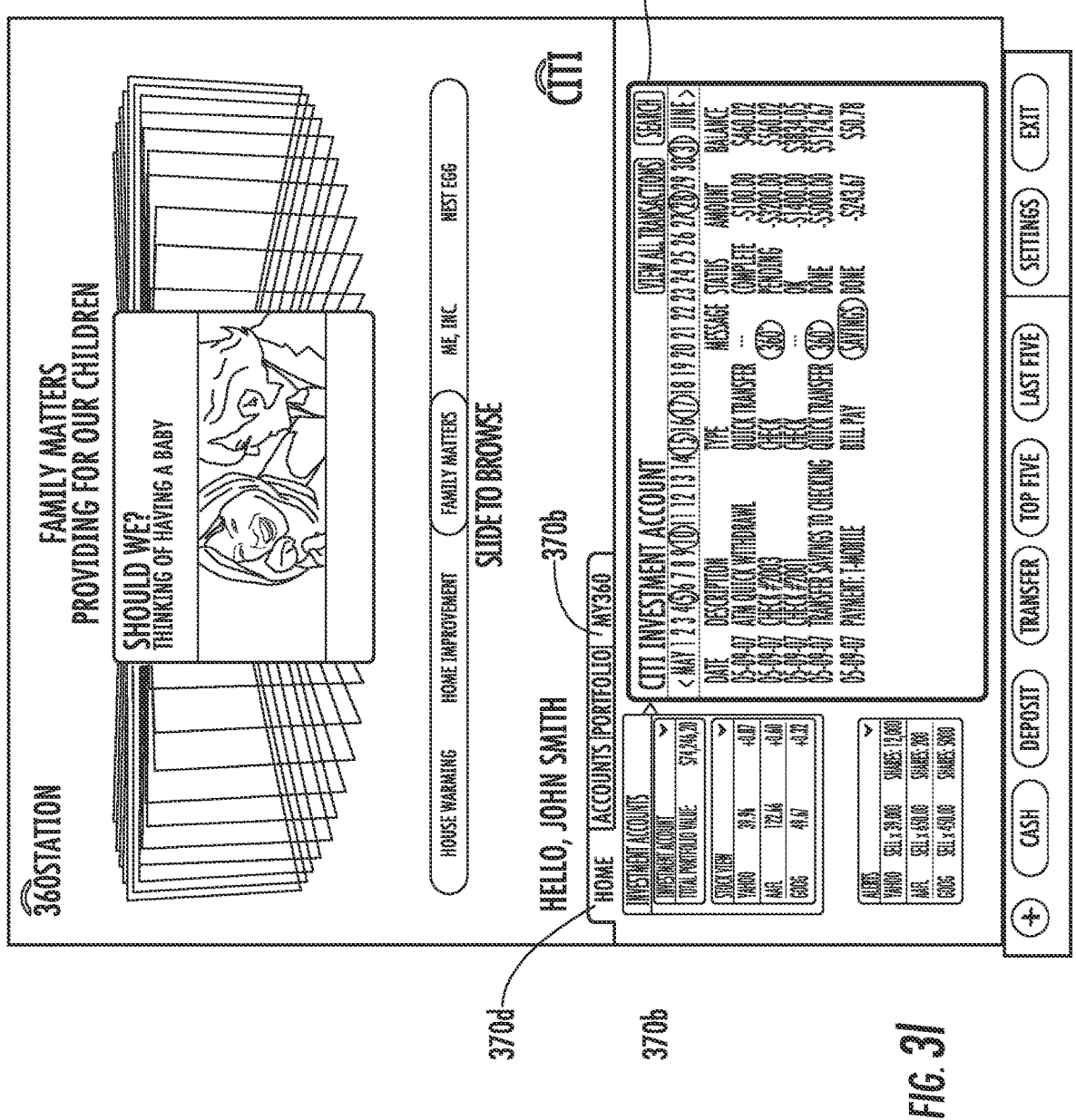
Figure 3M:
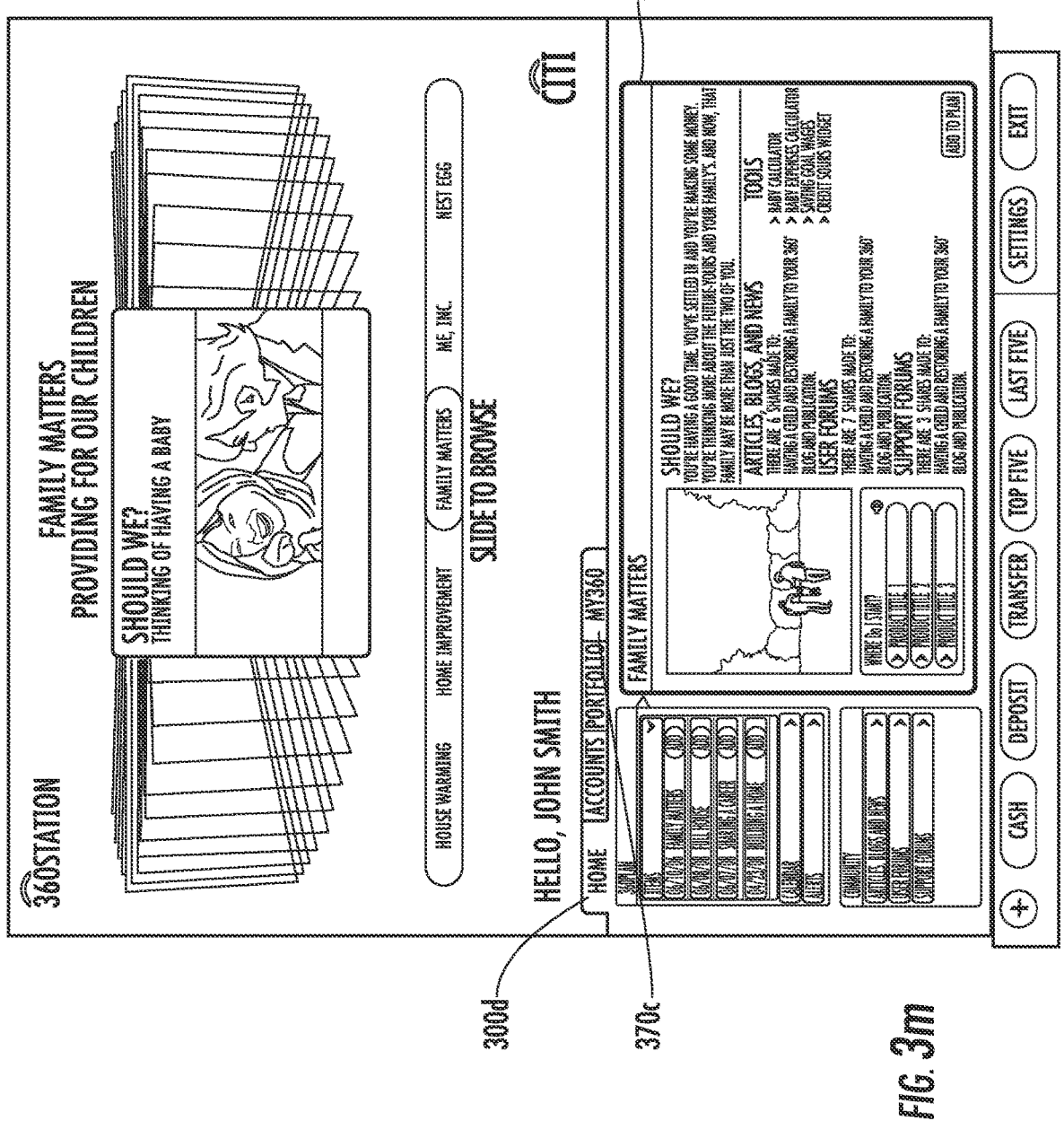

As discussed above, the user interface 300 can present one or more tabs 300d. The embodiments shown in FIGS. 3b to 3j depict exemplary widgets on a "Home" tab 300d. As shown in FIGS. 3k to 3m, an "Accounts" tab 370a can show information about the user's checking and savings accounts 375a, a "Portfolio" tab 370b can show information about the user's investment accounts 375b, and a "My360" tab 370c can show information about the user's financial planning 375c. In alternative embodiments, each tab 370a, 370b, 370c can present widget customized for that particular tab and can utilize the format and advantages shown in FIGS. 3b to 3j.

The widgets shown herein have a few particular advantages over the conventional solutions. In some exemplary embodiments, various items of financial information from various sources within the financial institution can be presented simultaneously on a single display. In some exemplary embodiments, a user can conduct a financial transaction on a first widget while other widgets are simultaneously updated in real-time and remain viewable on the display. In some exemplary embodiments, the user can use a widget to conduct a financial transaction without all of the steps conventionally needed to perform that transaction. In some exemplary embodiments, the user can create a widget based upon a particular financial transaction. In some exemplary embodiments, customized widgets on one touchpoint device can be viewed in a similar or the same layout on a user interface on another touchpoint device.

Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

The invention claimed is:

1. A computer-implemented method for customizing a user interface, the method comprising:
   receiving, by a server, from a touchpoint device, identification information entered by a user;
   accessing, by the server, a record of the user from a database using the received identification information;
   determining, by the server, whether the record has any financial transaction application windows configured for the user interface on the touchpoint device;
   transmitting, by the server to the touchpoint device, at least a first financial transaction application window and a second financial transaction application window identified by the record of the user for display of the first financial transaction application window and the second financial transaction application window simultaneously on the user interface of the touchpoint device;
   receiving, by the server, instructions from the user via the first financial transaction application window to perform a financial transaction;
   performing, by the server, the financial transaction while the touchpoint device displays at least the first financial transaction application window and the second financial transaction application window, wherein the first financial transaction application window and the second financial transaction application window are updated with real-time information; and
   appending, by the server, a widget bar to at least one of the first financial transaction application window or the second financial transaction application window based on evaluation of the financial transaction data performed at the at least the first financial transaction application window and the second financial transaction application window, wherein the widget bar displays a real-time update of a qualification status of the user corresponding to one or more financial services based on the evaluation of the financial transaction data performed at the at least the first financial transaction application window and the second financial transaction application window.

2. The method according to claim 1, wherein the touchpoint device is a personal computer.

3. The method according to claim 1, wherein the touchpoint device is a mobile phone, automated teller machine, kiosk, personal digital assistant, or tablet computer.

4. The method according to claim 1, wherein the financial transaction comprises a transfer from a first account to a second account, a bill payment, a deposit, or a cash withdrawal.

5. The method according to claim 1, wherein the user interface has a first portion and a second portion, wherein the first financial transaction application window and the second financial transaction application window are displayed on the first portion.

6. The method according to claim 5, further comprising presenting an electronic document on the second portion.

7. The method according to claim 1, wherein the second financial transaction application window comprises investment account information in real-time.

8. The method according to claim 1, further comprising providing updated account information to the first financial transaction application window and the second financial transaction application window in real-time.

9. A computer-implemented method for creating a financial transaction application window on a user interface of a touchpoint device, the method comprising:
   verifying, by a server, the identification of a user to access the user interface on the touchpoint device;
   receiving, by the server, from the touchpoint device, a request from the user to conduct a financial transaction;
   receiving, by the server, from the touchpoint device, transaction information for performing the financial transaction;

performing, by the server, the financial transaction;

presenting, by the server, the touchpoint device an option for the user to create a financial transaction application window based upon the received transaction information;

receiving, by the server, a selection by the user to create the financial transaction application window;

storing, by the server, in a database a record having information about the financial transaction application window for the user's user interface;

transmitting, by the server to the touchpoint device, information for presenting the user interface with a financial transaction application window for performing a transaction based on the transaction information; and appending, by the server, a widget bar to the financial transaction application window based on evaluation of the financial transaction data, wherein the widget bar displays a real-time update of a qualification status of the user corresponding to one or more financial services based on the evaluation of the financial transaction data.

10. The method according to claim 9, wherein the touchpoint device is a personal computer.

11. The method according to claim 9, wherein the touchpoint device is a mobile phone, automated teller machine, kiosk, personal digital assistant, or tablet computer.

12. The method according to claim 9, wherein the financial transaction comprises a transfer from a first account to a second account, a bill payment, a deposit, or a cash withdrawal.

13. The method according to claim 9, wherein the user interface has a first portion and a second portion, wherein a first financial transaction application window and a second financial transaction application window are displayed on the first portion.

14. The method according to claim 13, further comprising presenting an electronic document on the second portion.

15. The method according to claim 9, wherein the second financial transaction application window comprises investment account information in real-time.

16. The method according to claim 9, further comprising providing updated account information to the first financial transaction application window and the second financial transaction application window in real-time.

17. The method according to claim 9, wherein the transaction information comprises at least one of an account to withdraw funds, an account to deposit funds, an amount, and a periodicity for a recurring payment.

18. The method according to claim 9, wherein the user can customize the location of the first financial transaction application window on the user interface.

* * * * *